United States Patent [19]

Spence et al.

[11] 3,911,489

[45] Oct. 7, 1975

[54] SEARCH FEATURE FOR AN AUTOMATED TYPING SYSTEM

[75] Inventors: Gary W. Spence, Loretto; James L. Wienhold; Larry E. Kveberg, both of Minneapolis, all of Minn.

[73] Assignee: CPT Corporation, Hopkins, Minn.

[22] Filed: Dec. 26, 1973

[21] Appl. No.: 427,925

[52] U.S. Cl. .......................... 360/72

[51] Int. Cl. .......................... G11b 15/18

[58] Field of Search .............. 235/92 MP; 340/172.5; 360/49, 72, 4; 197/19, 20

[56] References Cited

UNITED STATES PATENTS

| | | | |
|---|---|---|---|
| 2,827,623 | 3/1958 | Ainsworth | 340/172.5 |
| 3,403,225 | 9/1968 | Mislan | 340/172.5 |
| 3,413,624 | 11/1968 | Murdoch et al. | 340/172.5 |
| 3,490,004 | 1/1970 | Ross | 340/172.5 |
| 3,501,747 | 3/1970 | Bungard et al. | 340/172.5 |
| 3,528,063 | 9/1970 | Kolpek | 340/172.5 |
| 3,675,207 | 7/1972 | Schlickener | 340/172.5 |

*Primary Examiner*—Vincent P. Canney
*Attorney, Agent, or Firm*—Drosey, Marquart, Windhorst, West and Halladay

[57] ABSTRACT

A search feature for an automated typing system for use with cassette tapes and other magnetically operated typing systems. This feature permits the operator of the machine to reach any position on a cassette tape where desired information is located and identified by a reference code. The reference code is entered into the system by holding a designated key on the typing system down such as the margin release key, while entering a single or multiple decimal digit numeric reference code. Then by depressing a SEARCH switch on the console, with RECORD on, the code is recorded onto the tape as a plurality of pulses which can be read and decoded in either direction of tape movement and at any speed. Thereafter, when the operator wishes to move to a particular location on the tape, the desired two digit numeric reference code is entered by depressing the designated switch, such as the margin release button on the typewriter keyboard, along with the applicable two digit reference code and then depressing SEARCH. RECORD is off for this sequence. The two digit reference code is displayed on the console by two light emitting diode readouts. Electronic circuitry implementing the search feature integrates operation with additional features of system as well as providing means for moving forward or backward on the tape without reference to address coding.

14 Claims, 16 Drawing Figures

SEARCH FEATURE FOR AN AUTOMATED TYPING SYSTEM

BACKGROUND OF THE INVENTION

The invention is designed to be utilized on an automated typing system which consists primarily of two functional units: (1) a console which contains two magnetic tape transports, logic, power supply, and operator function keys; and (2) a typewriter which is modified with an electronic keyboard, selected heavy duty parts and additional operator function keys. Such a typewriter is described in copending U.S. Patent Application Ser. No. 336,240 filed Feb. 27, 1973 entitled "Typewriter With Magnetic Memory."

An automated typing system of the class described performs the following operational functions. Information can be printed on hard copy and recorded simultaneously on magnetic tape. Information recorded on magnetic tape can be read and printed out on hard copy. Information recorded on magnetic tape can be duplicated onto a second tape in either a print or a non-print mode. Tape reading, skipping, or duplicating can be stopped automatically on a word, line, paragraph or page and unwanted information recorded on magnetic tape can be skipped over when the tape is being read or duplicated.

The feature which is the subject of this invention adds an additional function to those described above, it allows information recorded on magnetic tape to be searched for selective printing or duplicating.

Certain variations of coding on tape for search purposes are currently being utilized and a number of other variations have been suggested in the prior art. At least one system uses binary coding printed in sequential pulses or bursts of pulses on a tape. However, binary cannot be read except at synchronous capstan speed. This must be synced so that the no pulse or zero image can be read at the proper position.

Another standard search system in use uses single marks and sequential counting. Therefore, each tape must be started at the beginning of the tape while searching. If the machine is turned on in the middle of a tape it starts reading marks at the 01 position and thus does not truly relate the correct position on the tape.

Another system suggested or in use uses a mark or code at the end of each letter or document typed, referred to as an End Of Message (EOM) code. The system in a fast forward speed sequentially steps through a tape and stops every time it reaches an EOM code. Consequently, the operator of such a system must know precisely how many letters or "messages" are located in a tape and must keep track of how many times the system has stopped, thus indicating the number of "messages" skipped.

Another system suggested by the prior art utilizes specific addresses typed along with other information on the information channel of a two channel tape. Such a system uses a discontinuity in a clock pulse imposed on the other channel of the two channel tape and a comparator whereby the absence of clock pulses on the clock channel is used as a "mark." After every mark, the address entered on the data channel is read and compared with the address desired, which has been previously entered into a register. This procedure is continued until the desired address has been located.

SUMMARY OF THE INVENTION

The current invention is a highly improved search feature for an automated typing system which utilizes pulses which are coded on an address channel of a two channel tape which are absolute numbers and which are therefore readable in either direction. The correct address is read no matter where the tape is started and at any speed. With the circuitry to be discussed below the apparatus takes the code number, for example 02, and multiplies it by 8 and adds 4, thus yielding an absolute indicator of 20 pulses $[(2 \times 8) + 4]$. This series of pulses plus or minus 4 is to give a margin of error whereby the effect of random noise pulses and the like on a tape are eliminated. To read an address the system must show at least 8 pulses for the first position and multiples of 8 for later positions.

Specifically the circuitry operates in the following manner. For recording, the operator uses numbers on the input keyboard of the typing system and a designated key such as the margin release key. The designated input key produces an address strobe to enter the address into registers of the system. The first number of a two digit search or address code is initially entered into a units register on the first address strobe. On the second address strobe, which is generated by entry of a second digit, the code in the units register is transfered to the tens register on the leading edge of the address strobe. On the trailing edge of the pulse the unit address is loaded into the units register. Therefore this part of the system operates like a right/left shift register. Also on the trailing edge of the address strobe, numbers are loaded into a counter and into readout circuitry which provide a digital display of the numbers.

When the registers have been loaded a search switch is pressed on the operating console. This starts a timer which is referred to as a "start delay" timer which starts the tape moving and allows the tape to move up to speed (6 ips) before the address is recorded.

To search for an address, the registers are loaded as above. A shift register is utilized to create a normal running condition for the tape to accomplish the objects of the invention. After data has been entered and the search switch depressed, the shift register is initially loaded and the tape moves in a fast forward mode. This continues until data appears from the selected tape deck of the two deck system. The presence of data starts an "end of address" timer. This initiates a counter which counts data bits divided by 8. A second counter, initially cleared, counts the output of the first counter. This continues until the end of the block of data is received. At the end of the receipt of data the end of address timer times out and yields a pulse to compare the second counter with the registers into which the desired number has been entered. This is done in a comparator. The output indicating the "end of address" timer also loads the visual readout from the counter.

The condition of the comparator, whether or not it is greater than less than or equal to the number in the counter, determines whether or not the tape will continue in the fast forward mode. If the number in the counter is less than the number in the registers, it continues. If the number is greater than or equal to the number in the registers, the tape stops and a read timing gap timer is initiated.

When the read timing gap timer times out the tape is moved to a fast reverse mode. It moves backwards and performs the same comparitive operation as above. This continues until the number in the counter is less than or equal to the number in the registers. At this time the tape again stops and the read timing gap timer is again initiated and times out.

As should be obvious the purpose of the read timing gap timer is to assure that the tape is not jerked from one direction of movement to the reverse direction of movement. When the read timing gap timer times out, the condition mode shift register advances to a "run forward" mode which is the normal slow forward speed. The above process is then repeated again, i.e., the apparatus looks at the data, loads the registers in the counter and compares. This continues until the number in the counter is greater than or equal to the number in the registers. If the number is equal to the number in the registers, the tape then stops and the coded position has been located. However, if the number in the counter is greater than the number in the registers then the mode condition shift register is reset to wait prior to converting to a fast reverse speed. The read timing gap timer is initiated until it times out and a second pass flag is set on a second pass counter. The device runs the tape in fast reverse until the number in the counter is less than or equal to the number in the registers. It waits and then runs forward again and rechecks, stops and displays that number.

Therefore, if a search number is missing such as address 05, the apparatus operates in fast forward until it reaches 6, converts to fast reverse and goes back to 4, operates in run forward until it hits 6, and then operates in fast reverse until it hits 4 and then runs forward to 4 and stops, as the address number 05 cannot be found. With this method of reading tape, addresses must be in ascending order, i.e., 1, 2, 3, 12, 14, but need not be a continuous or consecutive sequence. Any time an address is passed when reading, skipping or duplicating, that address is displayed.

To record the address of the search code, the registers, counters, and readout are loaded as above. A search switch is pressed to set a flip-flop which enables a start delay timer and a record address timer. The start delay timer allows the tape to reach a speed of 6 ips. (run forward). The data is then written on the tape. Digits are subtracted from the digit counter at one-eighth the rate that they are written on the tape. Four pulses after the digit counter is equal to zero −4 a signal clears the original flip-flop set. When this is cleared it stops the data output and thus no more data is entered on the tape. The apparatus then waits until the record address timer clears which stops the tape motion. The record address timer provides a uniform record length making it possible to enter a 99 in place of a smaller number without disturbing other data.

Additional features as more fully described below are utilized to coordinate and make the invention a truly efficient system. For example, logical design enables tapes to be duplicated with address codes or allows information to be selectively produced with the use of a "skip" key. Another important feature permits the operator to move forward or backward one block of data to make corrections or alterations without erasing previously recorded information.

DESCRIPTION OF THE PREFERRED EMBODIMENT

Figure 1:
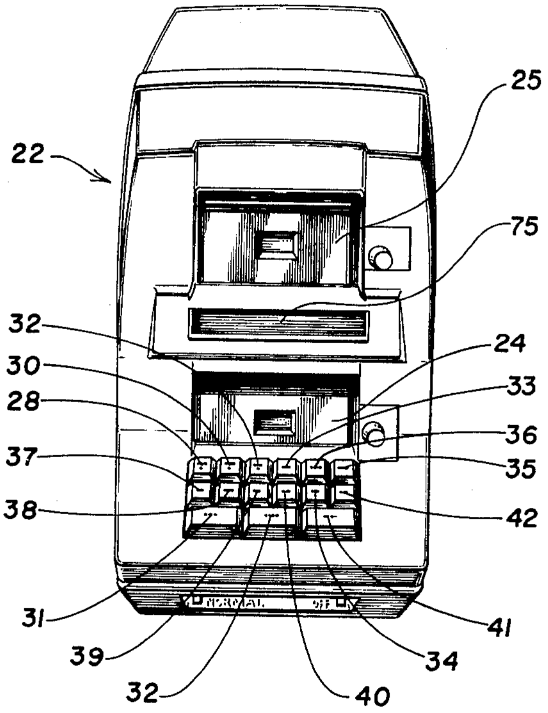
FIG. 1 is a perspective view of the console showing both tape deck stations, the visual search code readout and designated Operator Function Keys.

FIG. 1 shows a console 22 which houses two tape stations 24, 25 referred to as deck 1 and deck 2, respectively, each of which is suitable for cassette tapes. The tape is preferably driven at an average speed of 6 inches per second by tape capstans in a conventional manner and at an average speed of 90 ips per second by reel motors for search and rewind. The console also has a keyboard of fifteen keys or switches, 28 through 42. One or more of these keys are used for controlling recording and playback.

Indicia subscribed on each key designates the function that the system will perform when that key is depressed. For example, the rewind 1 key (RWD-1) 28 rewinds the tape in station 1. Rewind 2 (RWD-2) 29 rewinds the tape in station 2. Depressing the read key (READ) 30 activates read circuitry in station 1 or 2. Read 2 (READ 2) 31 enables the system to read from station 2. The skip key (SKIP) 32 is depressed to skip words, lines, paragraphs or pages. The duplicate key (DUP) 33 activates a transfer of recorded information from tape to tape. The adjust key (ADJ) 34 activates a right-hand margin adjust feature. The record key (REC) 35 enables the system to record information on a cassette tape in station 1. The code key (CODE) 36 plus various keys on the typewriter associated with the console records special control codes on the tape. The word key (WORD) 37 enables the system to read, or skip by word. The line key (LINE) 38 enables the system to read, skip, or duplicate by line. The paragraph key (PARA) 39 enables the system to read, skip, or duplicate by paragraph. The page key (PAGE) 40 enables the system to read, skip, or duplicate by page. The stop key (STOP) 41 when depressed, stops tape motion and all other activity. The search key (SEARCH) 42, when depressed, records search codes in the record mode and activates the search in the read mode.

The console 22 may be attached to any compatible typewriter (not shown) with appropriate modifications. Such a modified typewriter is described on copending U.S. Patent Application Ser. No. 336,240 filed Feb. 27, 1973 entitled "Typewriter With Magnetic Memory."

As indicated above, the search feature is capable of recording numbers on tape, reading numbers previously recorded on tape, and searching the tape to read numbers which were previously recorded thereon. In addition, logical circuitry which is a part of this invention also functions to establish the running conditions during the search mode of the operation.

Figure 3:
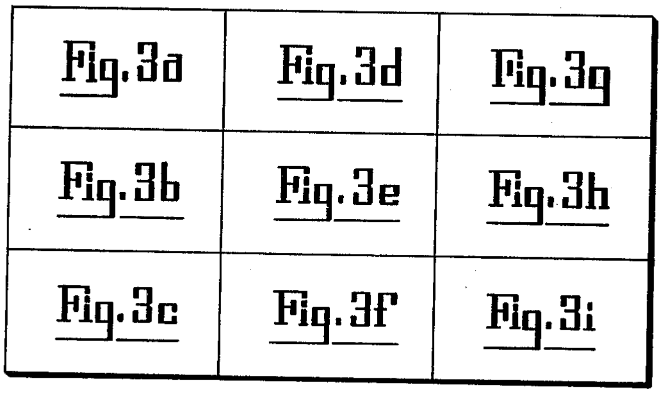
FIGURE 3 including
Figure 2A:
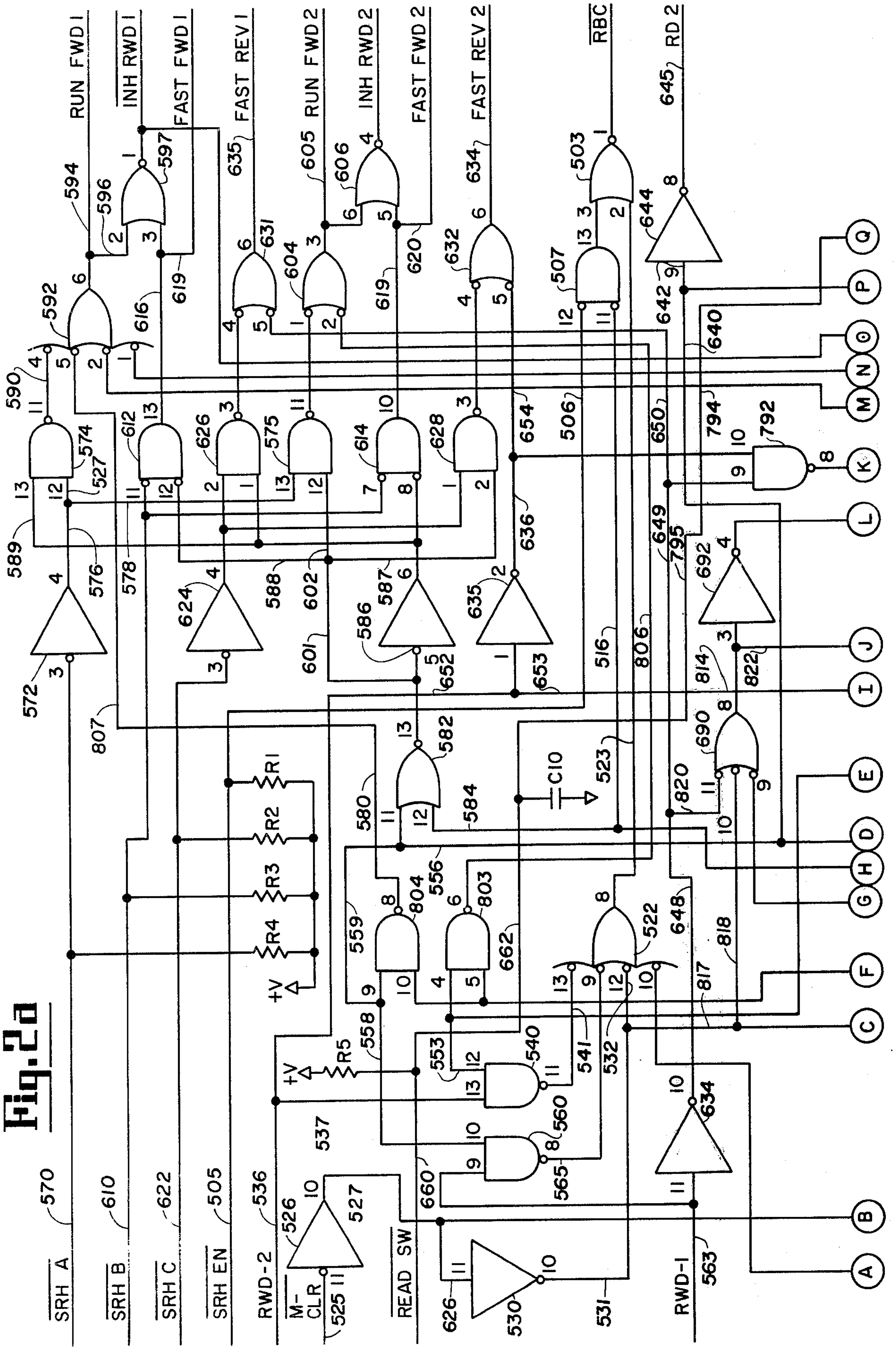
FIGS. 2*a*–2*d*, is a schematic diagram of logical gating which is associated with and responsive to the circuitry in FIG. 3 to produce the various modes of tape operation.
Figure 2B:
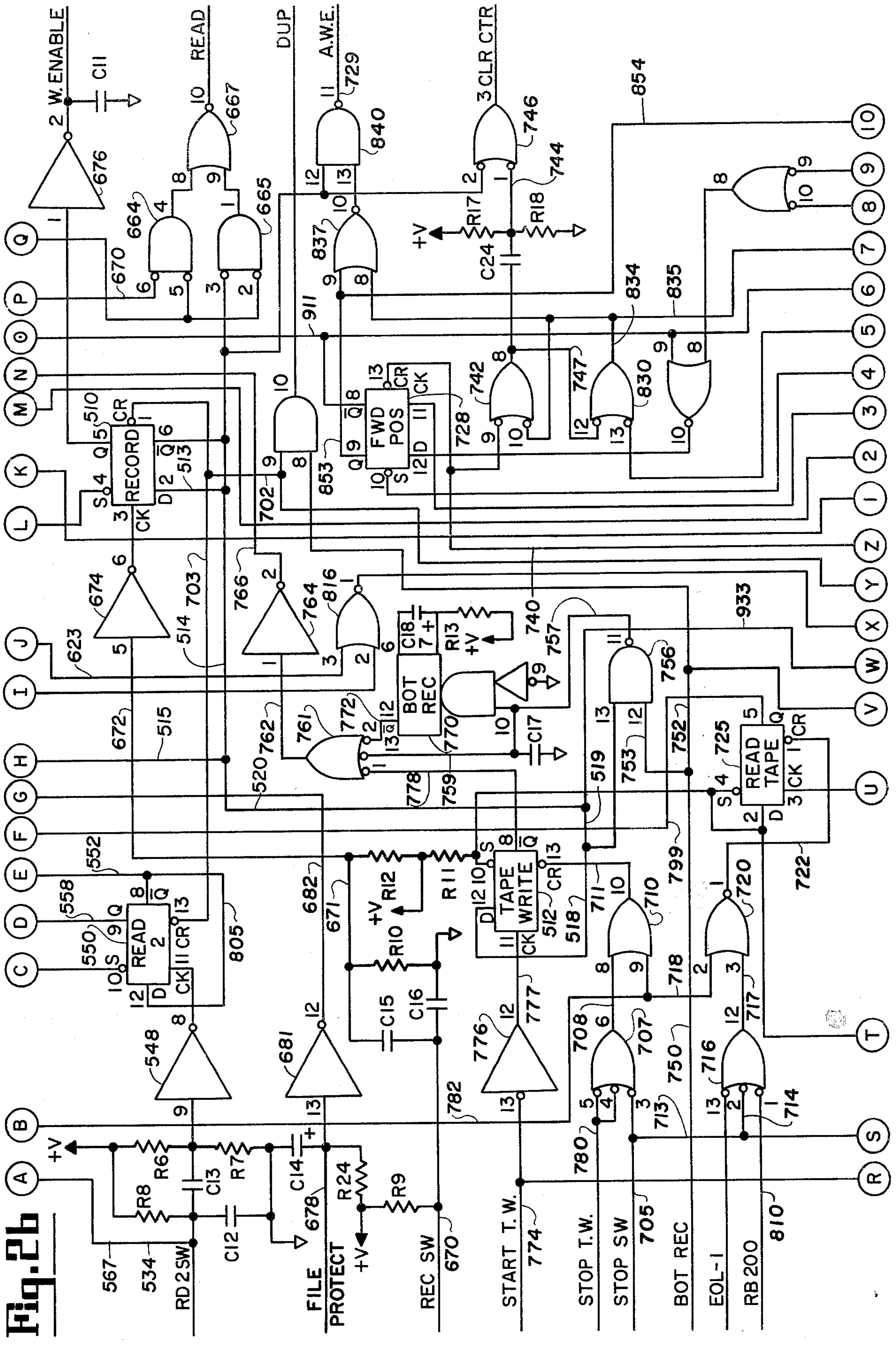
Figure 2C:
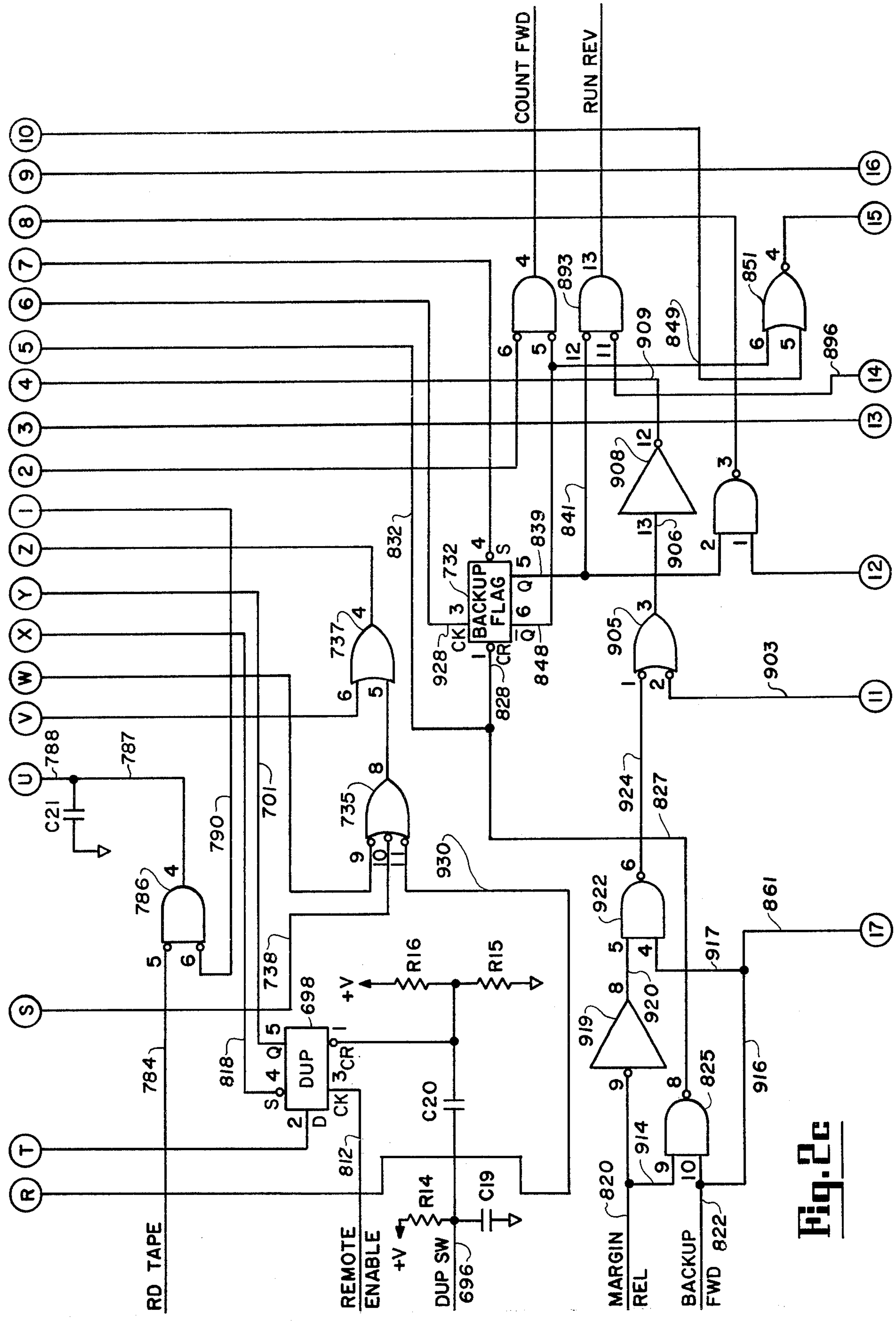
Figure 2D:
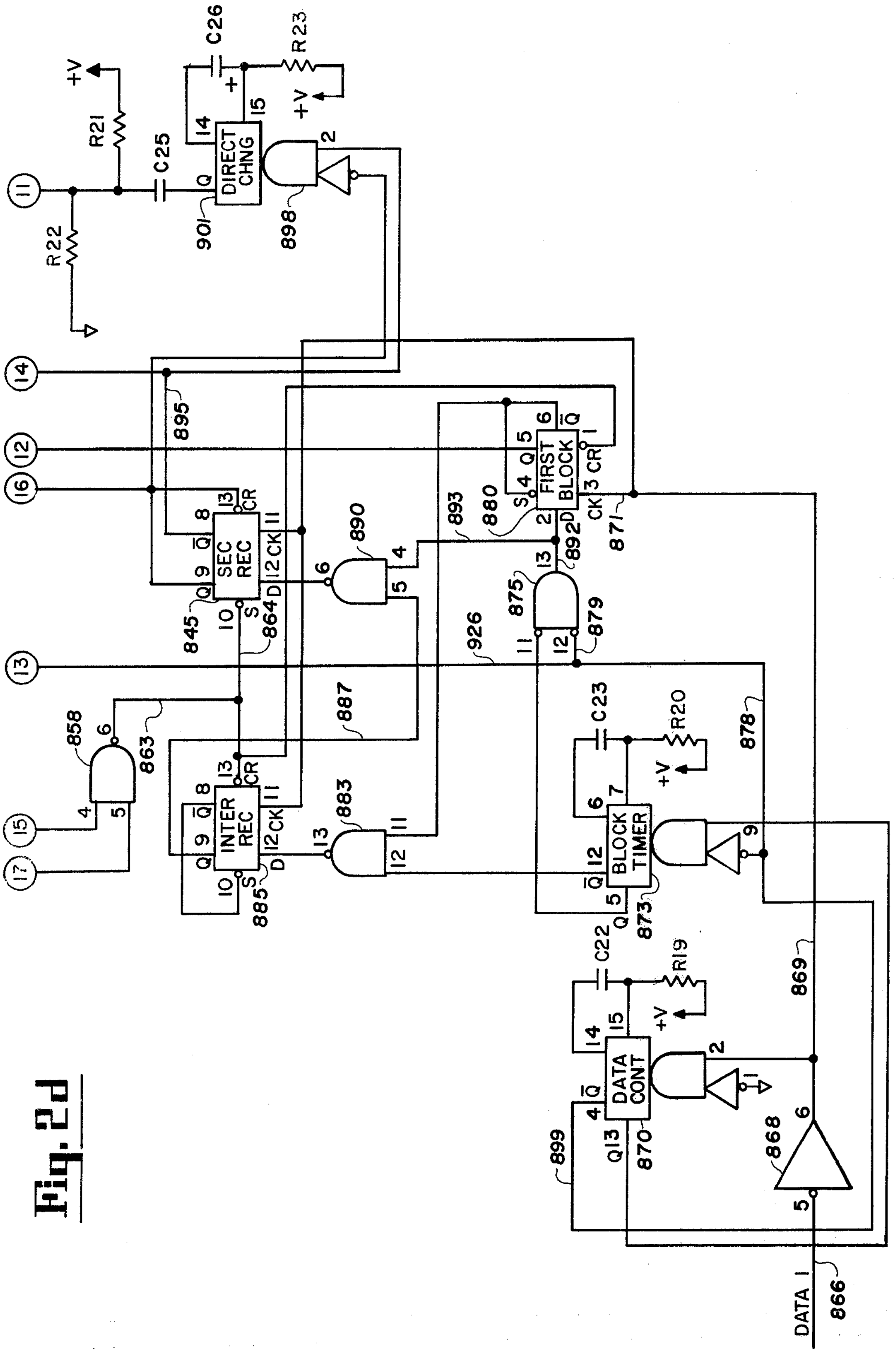
Figure 3A:
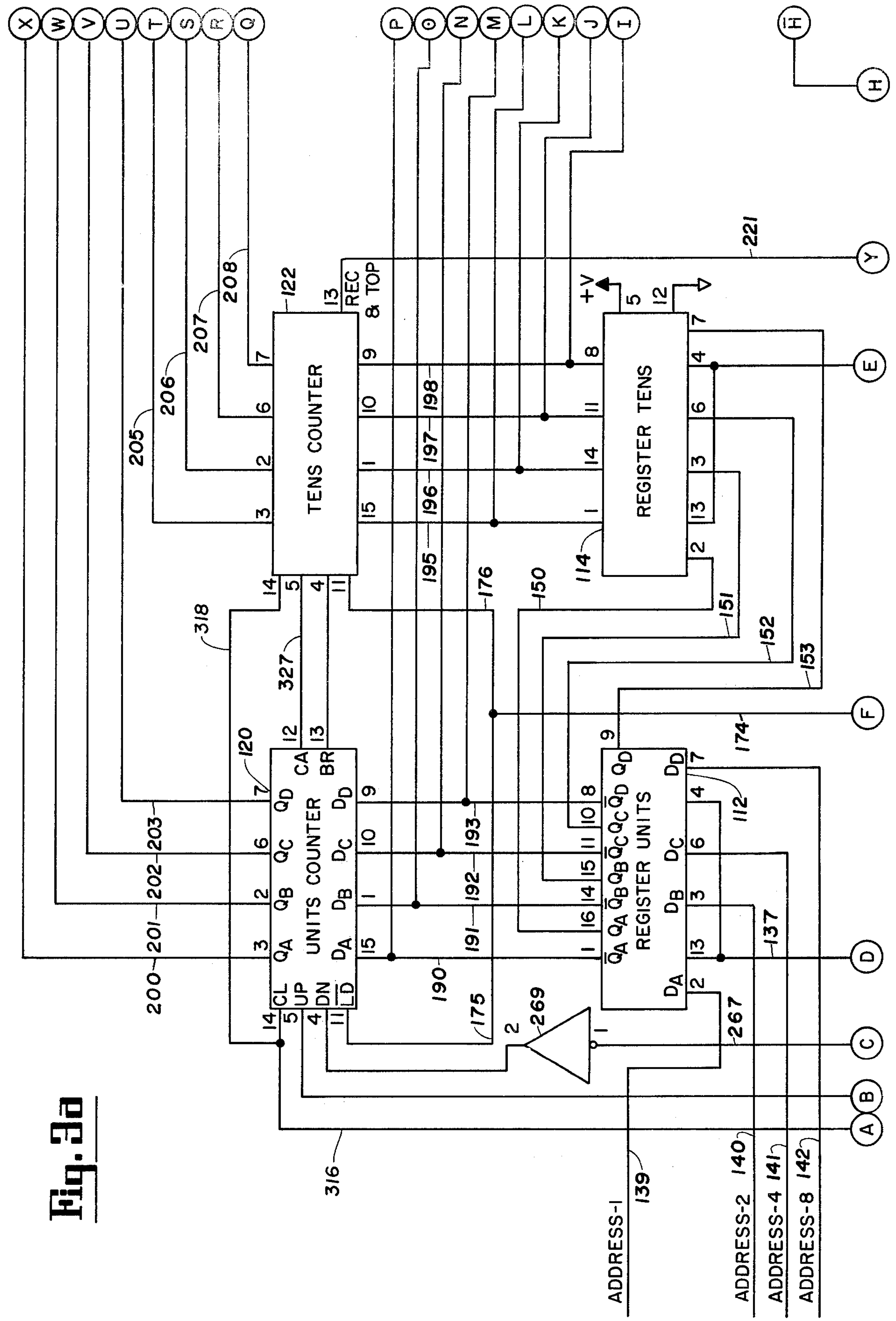
FIGS. 3*a*–3*i*, is a schematic diagram of the logical gating which allows the search codes to be entered on the tape, to be read, to be duplicated and to be searched to obtain a code position desired.
Figure 3B:
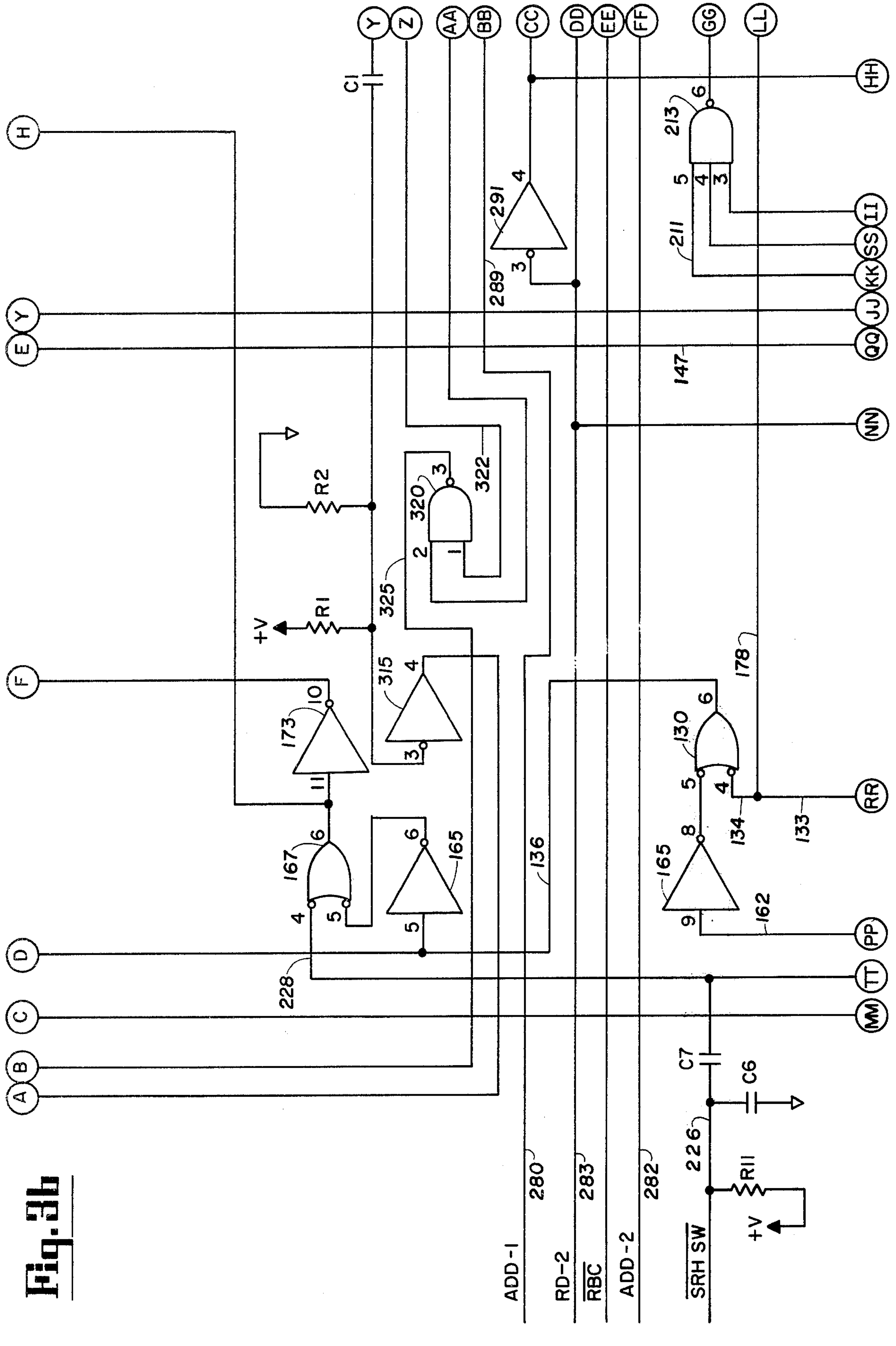
Figure 3C:
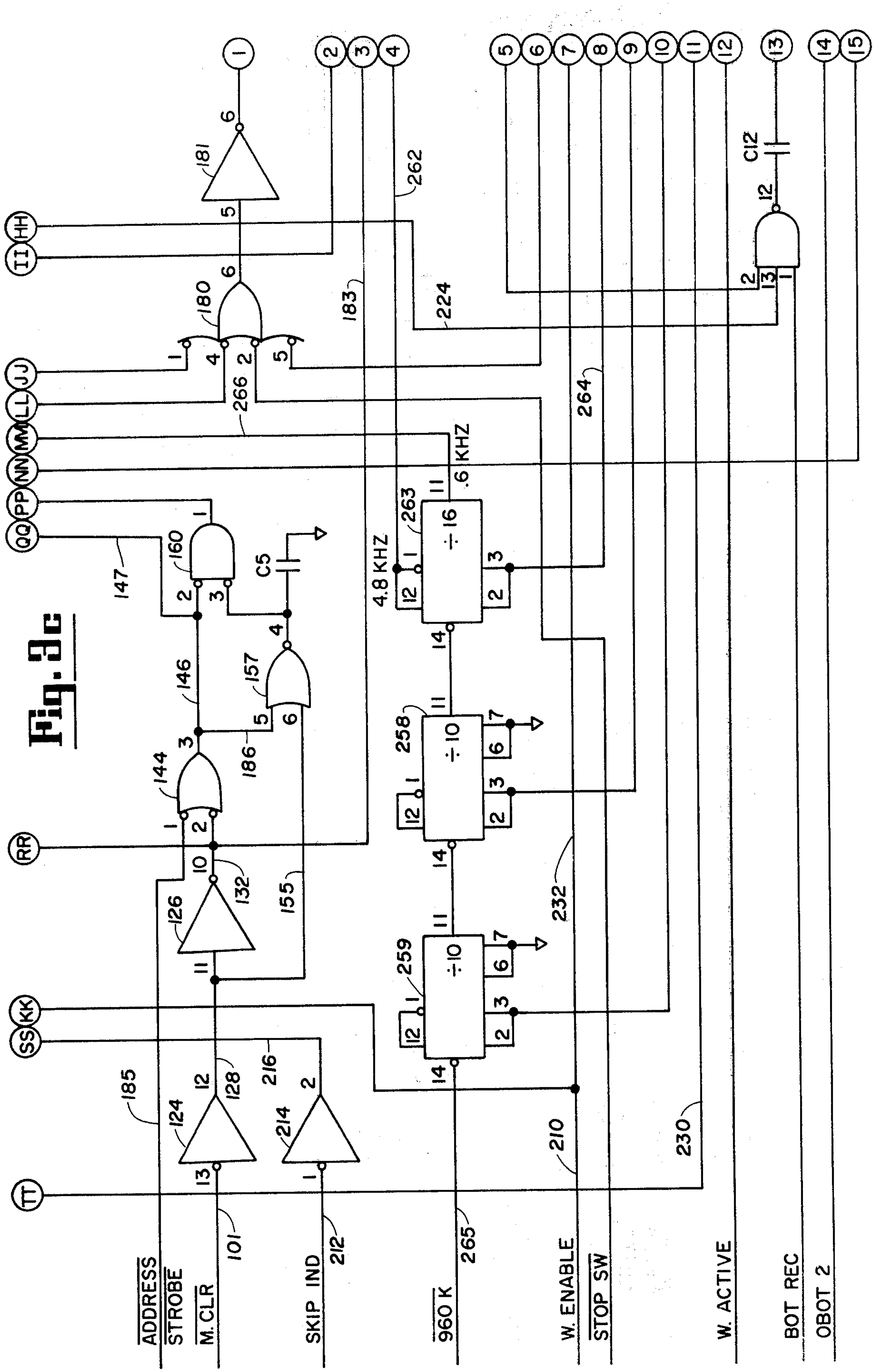
Figure 3D:
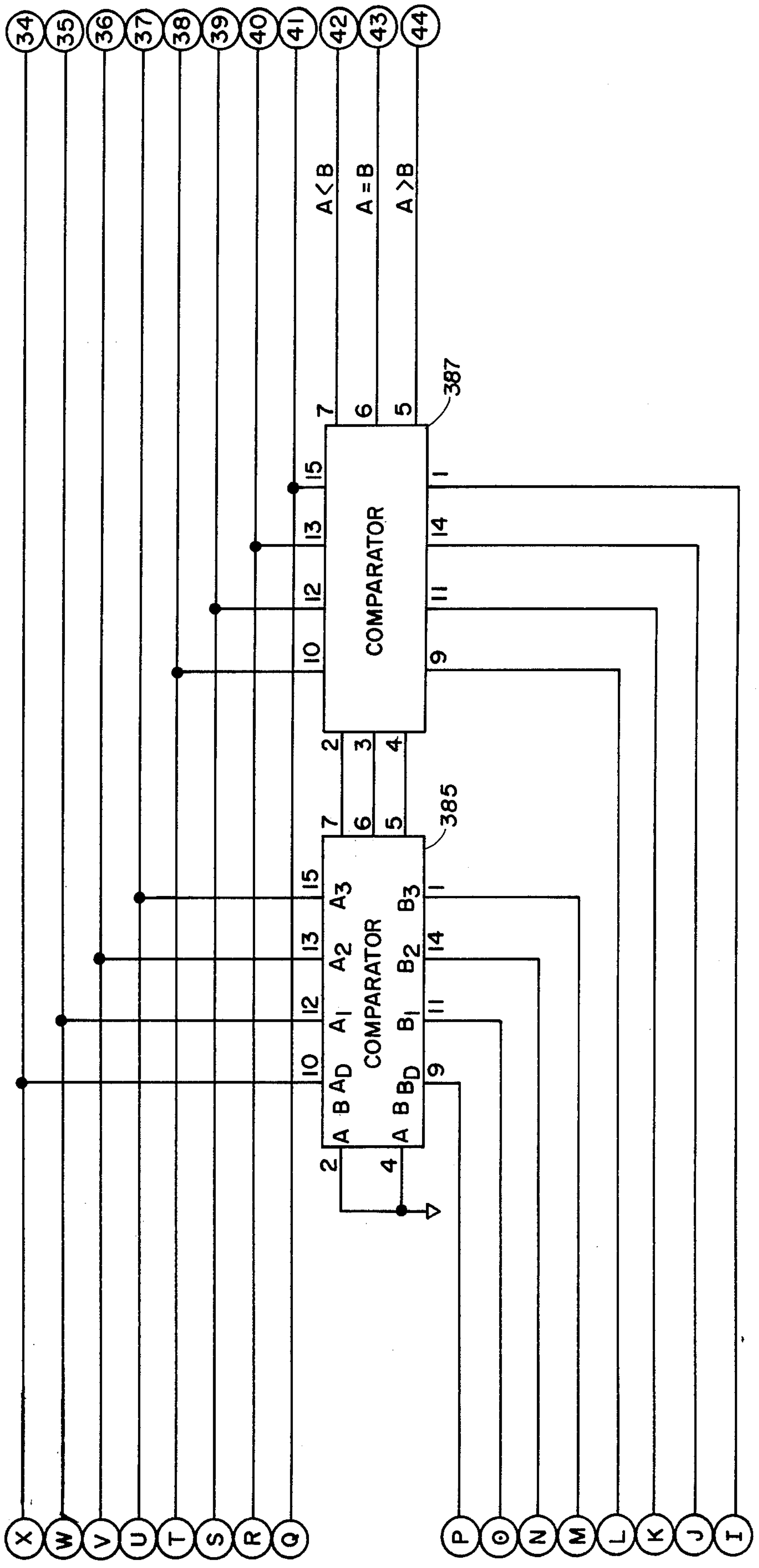
Figure 3E:
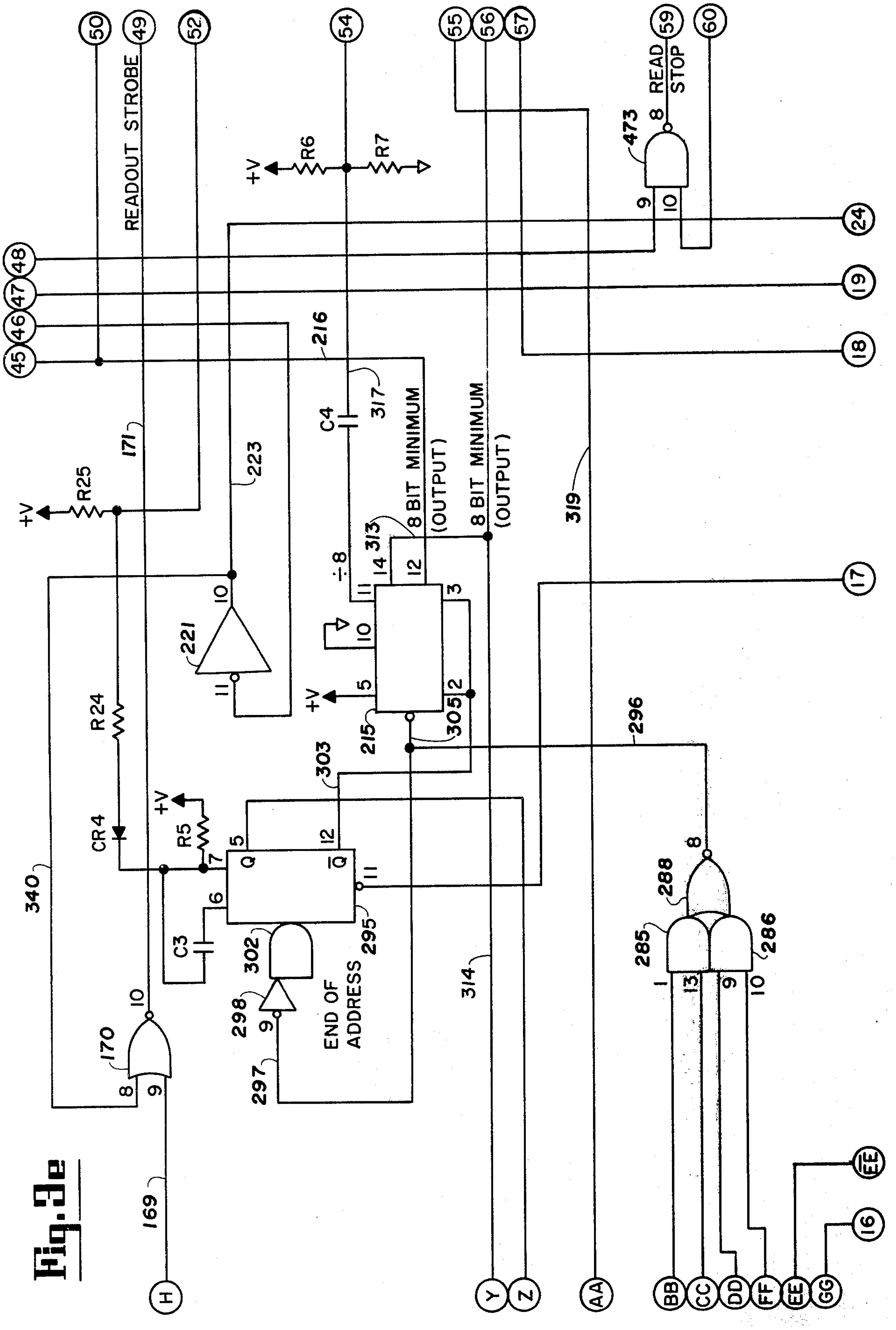
Figure 3F:
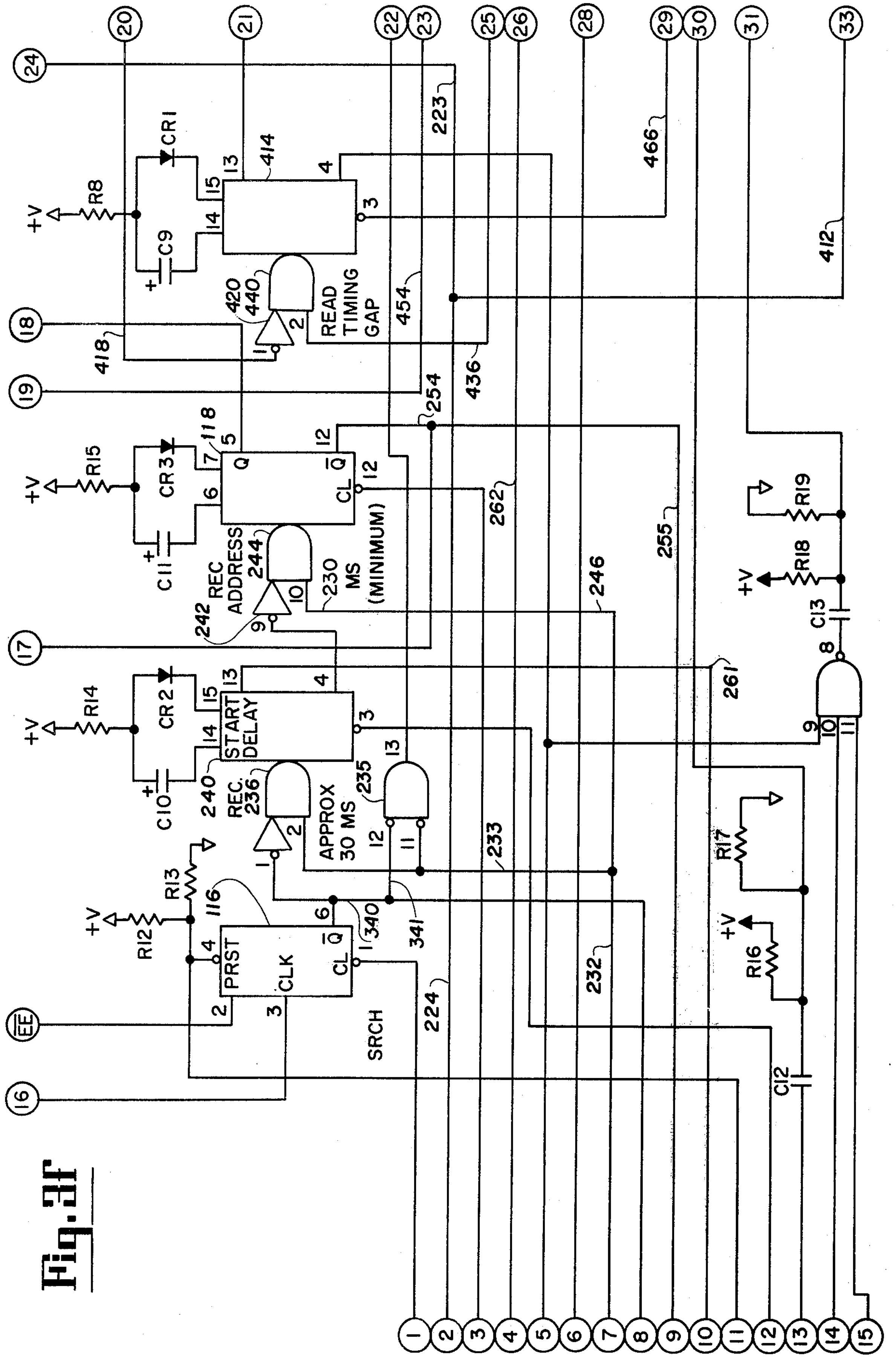
Figure 3G:
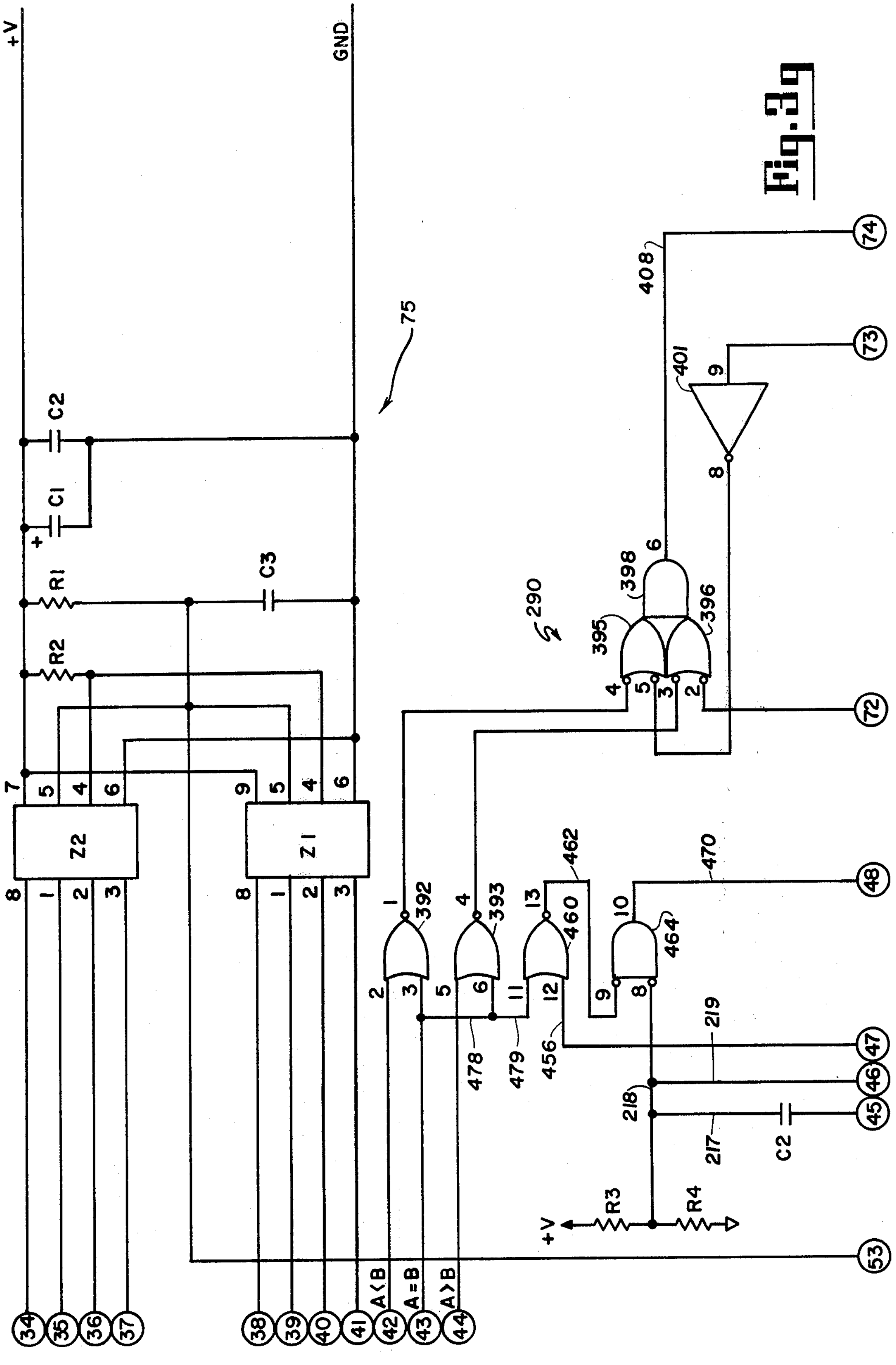
Figure 3H:
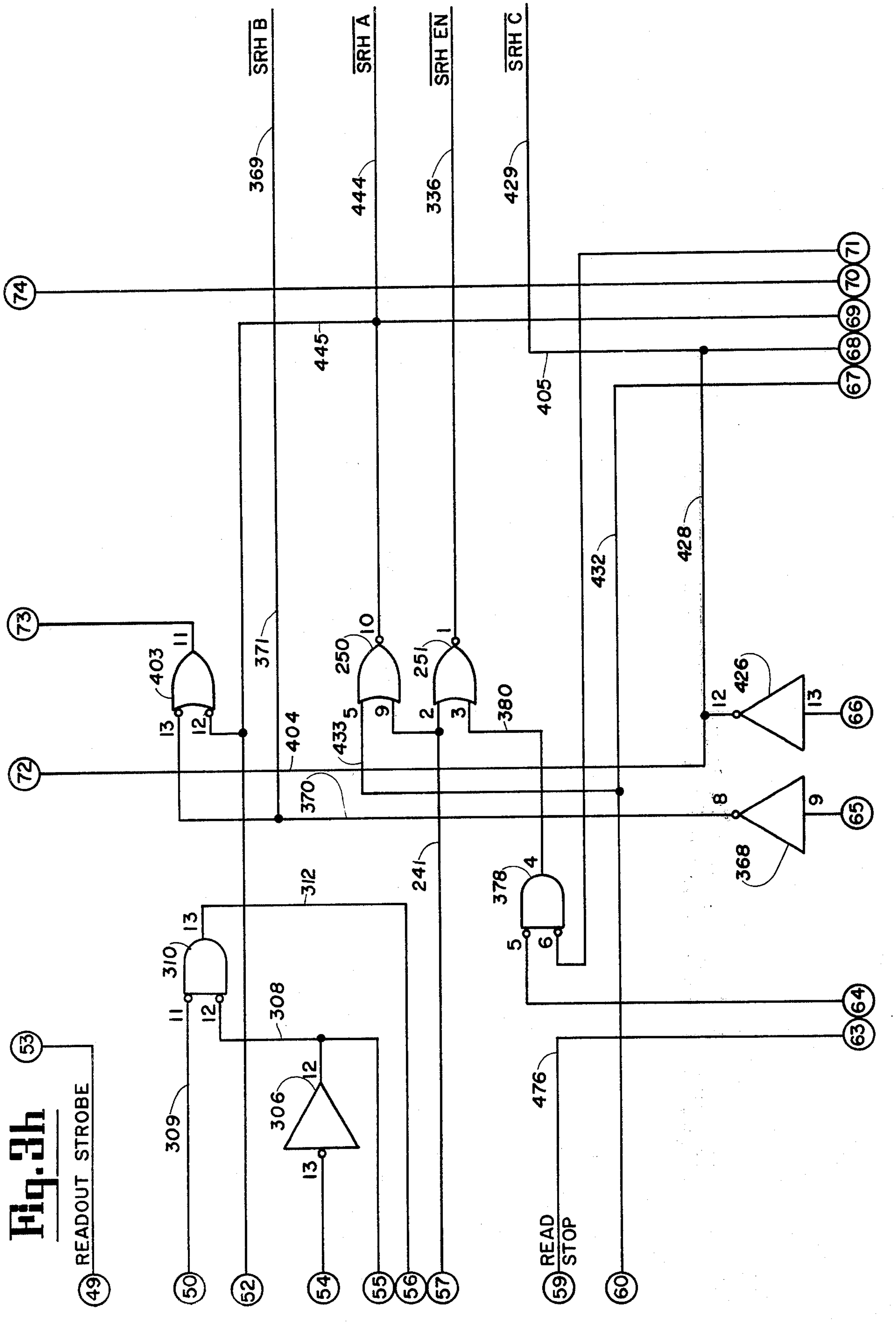
Figure 3I:
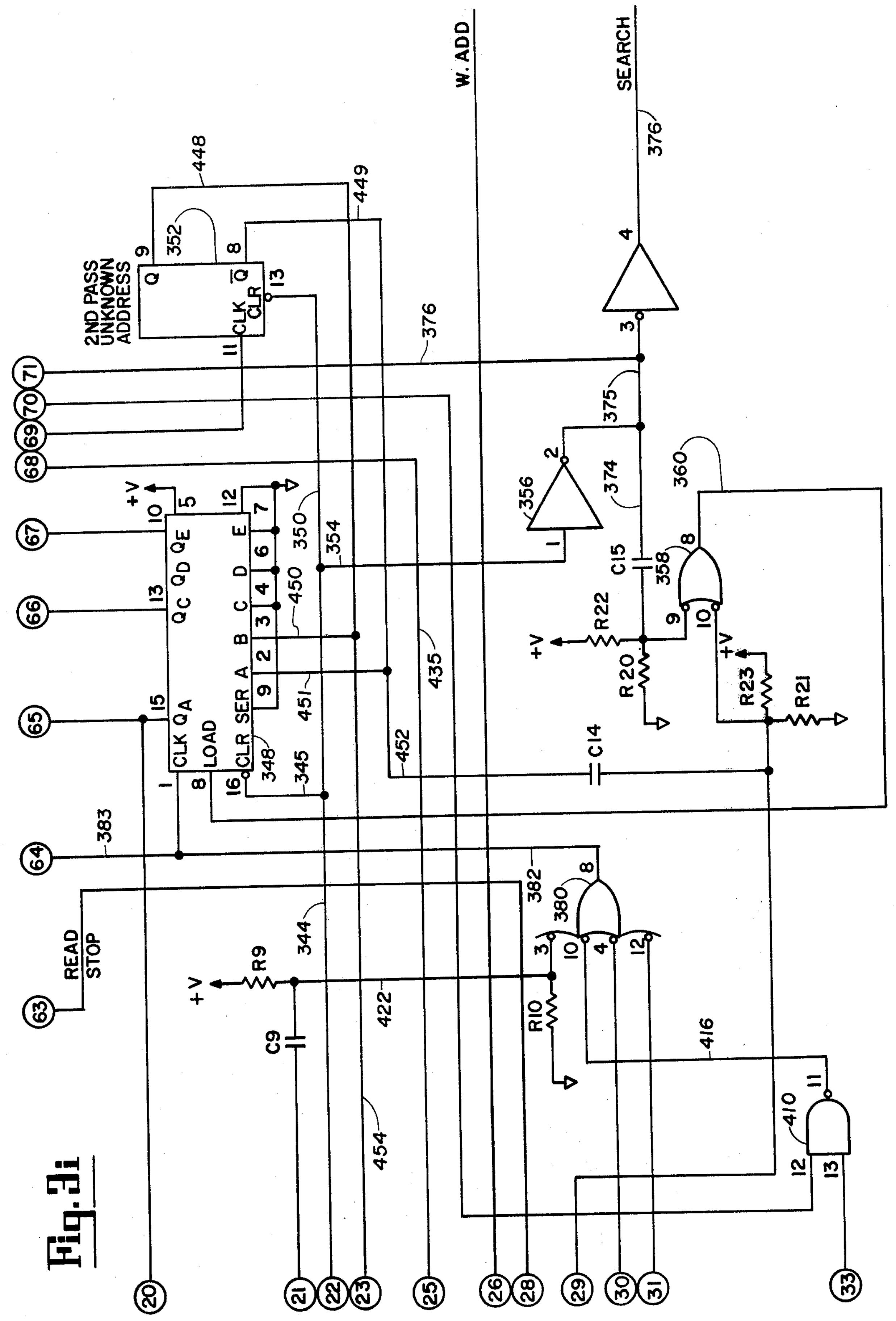

Entering Numbers Into The Counters, Registers, and Indicator Prior to Recording or Searching Referring now to FIG. 3, particularly FIG. 3*c*, when the unit is energized by turning on the power, a master clear signal is generated on input line 101. This functions to clear both the units register 112 and the tens register 114, to clear a search flip-flop 116 to be discussed below, and to clear a record address timer 118 also discussed below. In addition, the master clear will clear both a units and a tens counter, 120, 122, respectively, and the visual readout indicator 75 which is shown on the console 22 in FIG. 1 between the decks 24, 25.

The master clear is a low going pulse. The pulse is inverted with inverter 124 and then is reinverted to a low going pulse with inverter 126 along line 128. This is fed to input pin 4 of a positive input NAND gate 130 along lines 132, 133 and 134.

Since the positive input NAND gate 130 is being utilized in the logical circuit to perform an alternative function, that is to operate if either the input to pin 4 or the input to pin 5 is low, its representation on the schematic is that of an NOR gate which responds to low inputs represented by the circular inversion signal at the pins. This representation is used throughout the schematic diagraming to indicate not only the nature of the element but the function which it will perform. In these situations the gate will be referred to as a negative input NOR gate. When the input to negative input NOR gate 130 goes low the output on pin 6 is a high going pulse which clears the units register, the high pulse output being fed along lines 136 and 137 to input pins 4 and 13 of the units register. Since no alphanumeric code has been entered, the input to the register 112 on lines 139, 140, 141, 142 will be zero. This zero indication is loaded into the units register 112 when input pins 4 and 13 are clocked.

The high going pulse is also fed to input pin 2 of a second negative input NOR gate 144, the high going output of which on pin 3 is fed along lines 146 and 147 to clock input pins 4 andd 13 of the tens register 114. Since the input to the tens register 114 is the output of the units register 112, fed along lines 150, 151, 152, and 153, the tens register 112 will also be cleared.

The units and tens counters, 120 and 122 respectively, are also cleared by the high signal from output pin 6 of NOR gate 130. This signal is fed along line 136, inverted with inverter 165 and fed to negative input NOR gate 167, the high output of which is inverted with inverter 173 and connected with line 174 and lines 175 and 176 to input pins 11 of the units and tens counters 120, 122, which clears the counters 120, 122 by loading the zeros contained in the registers 112, 114 into the counters 120, 122.

As will be explained later, when the first digit of a number is entered into the system, the number in the units register will be loaded into the tens register and consequently if only a single digit number is entered, the zero presently in the units register will be transferred to the tens register which will give a correct readout and operation of the system. The low pulse obtained from inverter 126 is also fed along lines 133, 178 through negative input NOR gate 180, input pin 4, inverted with inverter 181 and is utilized to clear a search flip-flop 116, to be discussed below. That same output is also fed along line 183 to clear a record address timer 118, also to be discussed below.

After the power is on and the system is cleared and ready for operation, a number may be entered on the typewriter keyboard.

As each number is entered through the numeric characters of the keyboard with a designated key such as margin release depressed, it is converted with a BCD converter (not shown) to binary coded decimal representation. After the number is converted with the decimal to binary coded decimal converter to a four bit binary number, the least significant digit is present on line 139, the most significant digit is present on line 142, and the remaining significant digits on lines 140 and 141 in descending order, respectively. As each numeric key is depressed an approximate two microsecond low going pulse is produced on the system input line 185, designated ADDRESS STROBE. This low going pulse on line 185 is detected by negative input NOR gate 144 at pin 1 and this produces a high output on pin 3 of the NOR gate 144. This opens up the gate on the tens register 114, pins 4 and 13, which loads the number from the units register 112 into the tens register 114. The number from the units register 112 is present on pins 16, 14, 10 and 9 of the units register 112 and is fed to the input of the tens register 114 along lines 150, 151, 152, 153 to pins 2, 3, 6 and 7, respectively. If this is the first digit being entered, the previously cleared units register 112 will again clear the tens register 114.

When the address strobe goes away after about a 2 microsecond pulse it will close negative input NOR gate 144 and the output at pin 3 will go low. Thus, a low signal will be present on pin 2 of negative input NAND gate 160. However, the second input on pin 3 of the negative input NAND gate 160 will not go low instantaneously because the output of pin 3 of negative input NOR gate 144 is fed along line 186 to pin 5 of a NOR gate 157, the output of which is connected to a delay capacitor, C5. Therefore, the output of the negative input NAND gate 160 will be about a 2 microsecond pulse as well. This output is fed along line 162 inverted by the inverter 165 through negative input NOR gate 130, pin 5 to pin 6, along line 136 and loads the units register 112 by opening the gates through input pins 4 and 13 so that the number currently on lines 139, 140, 141, and 142 is loaded into the units register 112. In the same manner, the output is inverted with inverter 165 and the low output is fed through a negative input NOR gate 167, pin 5 to pin 6, is again inverted with inverter 173 and loads into the units counter 120 and the tens counter 122 the numbers in the registers 112, 114. This is accomplished along line 174 and lines 175 and 176, respectively, which are connected to pin 11 on each of the counters 120, 122 to load those counters 120, 122.

The numbers in the registers 112, 114 are loaded into the counters 120, 122 along lines 190, 191, 192 and 193, respectively, for the units counter 120 and lines 195, 196, 197 and 198, respectively, for the tens counter 122.

Also, the high output from the negative input NOR gate 167, pin 6, is fed along line 174 to NOR gate 170, pin 9 to 10, and is fed along line 171 to load visual indicators 75 in the readout circuit, pin 5. The numbers in the counters 120, 122 are also fed to the indicators 75, the units counter 120 being fed to the unit readout device 75 from output pins 3, 2, 6, and 7, respectively, along lines 200, 201, 202 and 203 to input pins 8, 1, 2 and 3, and the contents of the tens counter 122 from output pins 3, 2, 6 and 7 being fed along lines 205, 206, 207 and 208 to input pins 8, 1, 2 and 3 of the tens visual indicator 75.

If, for example, the number 21 is the desired address, the number 2 has now been entered into te system and the registers 112, 114, counters 120, 122 and visual readout 75 all indicate an 02 in the system. The next stip is to enter a 1 and going through the same pulsing sequence, the 2 will be removed to the tens register 114, the 1 will be entered in the units register 112, the registers 112, 114 will be loaded into the counters 120, 122 and the number in the counters 120, 122 will be loaded into the storage register and readout devices 75. The number 21 will then be present in the system.

After the register 112, 114, counters 120, 122 and readout device 75 are loaded with the number desired, two procedures can take place. The number can either be recorded on the tape or the tape can be searched to look for the number.

Recording Numbers on Tape

If a number is going to be recorded on tape, the record switch 35 is depressed which produces a record enable or write enable on input line 210. That enable is fed along lines 210, 211 to input pin 5 of a NAND gate 213. Since the system is not in the skip mode of operation, a low signal is present on skip input line 212 which is inverted by an inverter 214, pin 1 to 2, and fed along line 216 to enable pin 4 of the NAND gate 213. Input pin 3 of the NAND gate 213 is enabled because the system is not reading data at the time. The input to pin 3 originates from the read output counter 215, pin 12, is fed along lines 216, 217, 218 and 219, is differentiated with C2, R3 and R4 and then inverted by inverter 221, fed along lines 223 and 224 to the input pin 3 of the NAND gate 213.

The search switch 42, which is also a contact closure upon depression of the search button 42, gives a low going signal on input line 226. This is differentiated with resistors R12 and R13 and capacitor C7, R11 and C6 being debounce components. This gives a differentiated pulse which is fed along line 228 to negative input NOR gate 167, the output of which in the manner described above loads the number presently in the register 112, 114 into the counters 120, 122. The high output of negative input NOR gate 167, pin 6, is also fed along line 169 to NOR gate 170 to indicate the number being recorded on the readout device 75 along line 171.

The differentiated pulse is also fed along line 230 to preset the search flip-flop 116, pin 4. Since the write enable input is also being fed along lines 210, 232 and 233 to pin 11 of a negative input NAND gate 235 and to pin 2 of an integral AND gate 236 on a start delay timer 240 as a high signal, it disables negative input NAND gate 235 and it enables the AND gate 235 which initiates the tape write sequence. That initiates the start delay timer 240.

When that timer 240 starts, the low output which appears on pin 4 of the start delay timer 240 is inverted with an integral inverter 242 in a record address timer 118, which enables an integral AND gate 244 to initiate the record address timer 118. The second enable on the integral AND gate 244 is the write enable signal which is fed to pin 10 of that gate 244 along lines 210, 232 and 246. The record address timer 118 is set for approximately 240 to 250 milliseconds with a 230 millisecond time minimum. When it is initiated, pin 5 goes high and is fed along line 247 to the inputs, pins 2 and 9, respectively, of two NOR gates 250, 251. The outputs of each are utilized as will be explained below with reference to FIG. 2 to start the tape at a run forward (6 ips) speed.

It takes a certain amount of time for the tape to get to recording speed and thus the start delay timer 240, which was fired as explained above, is utilized to delay recordation of data until that timer 240, which is a shorter time of approximately 30 milliseconds, times out. This is accomplished in the following manner.

Because a record sequence has been initiated the record address timer 118 is active and the low output of the timer 118, pin 12, is fed from output pin 12 along lines 254, 255 to enable a divide by 10 counter 258 through input pins 2 and 3. The fact that the start delay timer 240 is active prevents the first divide by ten counter 259 from going active as the high output on pin 13 of the start delay timer 240 is fed along line 261 to the input pins 2 and 3 of that divide by ten counter 259. When the start delay timer 240 times out this will activate, along the same line 261, pins 2 and 3 of the counter 259 and that counter 259 will be active as well. The third counter 263, which is a divide by 16 counter, is activated along line 264 when the search enable flop 116 is set. When all three divide by counters 258, 259, 263 have been activated, the input signal of 960 kilohertz on input line 265 will be divided by the counters 258, 259, 263 so that 4.8 kilohertz will appear at output pin 12 and input pin 1 of the divide by 16 counter 263 and 0.6 kilohertz will appear at pin 11 of the divide by 16 counter 263.

The 4.8 kilohertz signal from pin 12 of the divide by 16 counter is fed along line 262 to an amplifier board which records those pulses on the tape in a conventional manner. The output signal is a conventional square wave signal which is recorded with conventional equipment (not shown). The output of pin 11, which is 0.6 kilohertz, obviously emits 1 pulse every time 8 pulses are emitted on output pin 12 to be stored on the tape. This output is fed along lines 266, 267, is inverted by inverter 269 and is utilized to count down the number in the units counter 120 with input pin 4. Consequently, every time 8 pulses are recorded on the tape, the number in the counters 120, 122 is reduced by 1.

As is conventional with counters, the number in the units counter 120 will be counted down to zero, a borrow pulse will appear on pin 13 of the units counter 120 which will reduce the number in the tens counter 122 by a factor of 1 and will fully load the units counter 120. This will continue until no numbers are left in either the tens counter 122 or the units counter 120 and then a borrow pulse will appear on pin 13 of the tens counter 122.

Since the output of divide by sixteen counter, pin 16, is at one-eighth the rate of the initial output, pin 12, the aforementioned formula of eight times the address in the units counter 120 plus four (8N + 4) is recorded on the tape. This is accomplished in the following manner.

The output from pin 11 of the divide by 16 counter 263 is high for the period of four pulses emitted on output pin 12, and then is low for four pulses emitted from the output pin 12. Each time it goes low, it is fed along lines 266, 267 to inverter 269 which clocks the units counter 120 down one additional number. Consequently, since the low point signal does not come until after the first four pulses have been emitted on output pin 12, the units counter 120 and consequently the tens counter 122 is not clocked until four additional pulses have been emitted from the last time that the interval of eight pulses were emitted. In other words, the units counter will not emit a borrow pulse until the next time the clock goes high, but the clock does not go high until four pulses after the initiation of a series of eight pulses. When the clock does go high, the borrow signal is emitted on pin 13 of the tens counter 122 which is fed to negative input NOR gate 180 along line 271. The high output on pin 6 of the NOR gate 271 is inverted with an inverter 181 and that low output is utilized to clear the search flip-flop 116 which initiated the process. When that flip-flop 116 is cleared pin 6 goes high and is fed along line 264 to disable the divide by 16 counter 263 on input pins 2 and 3.

Note the other two timers 240, 118 are still enabled until they time out. The balance of the timing mechanism is for the purpose of a fixed length record. Therefore, the tape is run a certain length during the period of time that the record address timer 118 has been activated. This means that if recording is initiated and only twelve pulses are to be placed on the tape even though the pulsing, circuitry will be active for only a fairly short amount of time, the length of time the tape runs will be the same. By this design, utilizing variable data time, but fixed length record time, an operator of the system may accidentally record a one in an address location, later come back to that address location, and put the number 99 in the same position without using any additional length of tape.

Recording may also be done in another sequence. This is in the duplicating sequence in which tape from one deck, deck 2, is read and recorded on tape in deck 1. In this sequence any time an address is read on deck 2 it is recorded on deck 1. This is accomplished much in the same manner as above with the following modifications. The system is still in a record sequence of operation and thus the write enable input on input line 210 is still present as explained above. When an address is read, which is explained more fully below, the presence of address data and the absence of address data is detected by a data counter 215. A low going signal will appear on output pin 12 of the counter 215 when address information is no longer being read from the tape. This is differentiated with C2, R3 and R4 and fed along lines 216, 217, 218 and 219 to the input of inverter 221 and the high going pulse that appears on pin 10 of the inverter 221 is fed along line 224 to input pin 3 of the NAND gate 213. As explained above, pins 4 and 5 are high and when 3 goes high, a pulse is emitted from pin 6 of the NAND gate 213 which clocks the search flip-flop on through pin 3 to initiate the record sequence as explained above.

As will be explained during the read sequence following, the number in the counter will be the number which is read from the tape in the deck 2 station and accordingly, the number recorded on the tape in deck 1 will be a multiple 8 plus 4 of that address.

Read Sequence for Duplicating or Locating a Specific Address

When the system is activated to read addresses from one of the tapes for either duplicating or locating a specific address the following inpul signals will exist. When locating a specific address input data read from tape 1 will appear on input line 280 designated address 1. Input data from the second tape or deck 2 will appear on input line 282. In addition a signal may or may not appear on the "read 2" input line 283. This signal is conditioned by the operator of the console. If information is desired from deck 2 the "read 2" button 31 will be depressed and an input signal will appear on input line 283 indicating that deck 2 will be read. In the event that the read 2 button 31 is not depressed then no signal will appear at the read 2 input and, as explained below, data will be read from tape 1. Since in the preferred embodiment duplication only occurs from deck 2 to deck 1, the read 2 enable will always be active when duplicating and data will only be read from that tape deck. It should be understood, however, that with minor modifications either deck could be duplicated to the other and these embodiments are within the intendment of the invention.

The data on tape 1 is fed from input line 280 to pin 1 of a positive input AND gate 285. The AND gate 285 may or may not be enabled depending on whether or not an enable signal appears on the read 2 input line 283. The information from deck 2 will be fed along the line 282 to pin 10 of another positive input AND gate 286. The output of both AND gates 285, 286 are fed to a NOR gate 288 and the selected data will appear at the output pin 8 of that NOR gate 288. If "read 2" is enabled the high signal is fed along line 283 to input pin 9 of positive input AND gate 286 to become the second enable signal for that AND gate 286. In addition, the other positive input AND gate 285 is disabled in that the high signal from line 283 is fed along line 289 to inverter 291, pins 3 to 4, to disable pin 13 of positive input AND gate 285. Conversely, if read 2 switch has not been enabled the low input appearing on line 283 will be inverted by inverter 291 to a high signal to enable pin 13 of positive input AND gate 285 so that the output of the AND gate 285 will be the data read from the tape in deck 1 along the address 1, line 280. In any event, whichever address is enabled by virtue of the read 2 enable that output will be fed to NOR gate 288 and will appear as the output of pin 8 thereof.

Therefore, the pulses which were previously recorded on the selected tape will appear as the output of pin 8 every time the tape passes those numbers. When pulses first appear at the output of pin 8 they are fed to the input of a retriggerable one shot 295 along lines 296, 297 through inverter 298 and AND gate 302 which are integral parts of the timer 295. As long as the pulses come in close enough succession the one shot 295 will not clear. If the one shot 295 does not clear it holds pins 2 and 3 of a data counter 215 through line 303 to enable the counter 215.

The output of NOR gate 288, pin 8, is also fed along lines 296 and 305 to the input of the counter 215 at pin 1. The counter 215 is a divide by 16 counter. After four input pulses pin 11 goes high and after four additional pulses have been counted, output pin 11 goes low. The low going edge is differentiated by C4, R6 and R7 and the pulse is inverted by inverter 306 and fed along line 308 to the input, pin 12 of a negative input NAND gate 310. The output on pin 13 of the NAND gate 310 is fed along lines 312, 313 to clock the last section of the divide by 16 counter 215, input pin 14. When this register 215 is clocked it indicates that there has been at least an eight bit minimum input. When that last section has been clocked an output signal appears on pin 12 of counter 215 and creates a DC hold. This is fed along lines 216, 309 to input pin 11 to disable negative input NAND gate 310 so that the register cannot be clocked more than once. In addition, the output pulse from NAND gate 310 is differentiated with C1, R1 and R2 and the low going pulse is fed along lines 312 and 314, inverted with inverter 315 and utilized to clear the counters 120, 122 at input pins 14 thereof along lines 316 and 318. Therefore, after eight pulses have been counted, a sufficient data has appeared on the tape to indicate that an address is being read. It should be understood that if there is random noise on the tape such as one or two pulses there will be no output from the divide by 16 counter 215 and thus the circuitry will not be activated.

As pulses continue to appear on the input the retriggerable one shot 295 will continue to stay latched as long as there is signal input. Therefore, every time the signal on pin 11 of the divide by 16 counter 215 goes low, signifying that eight additional data pulses have been counted, the low going signal is differentiated with C4, R6 and R7 and fed along line 317 to inverter 306, pin 13 to 12 which is fed along line 319 to positive input NAND gate 320, pin 2. NAND gate 320 is enabled through pin 3 by the output of the retriggerable one shot 295 from output pin 5 along line 322. As long as this one shot 295 remains high because continuous pulses are being received the circuit will continue to count the number of pulses on the tape divided by eight. This is done in the following manner.

The output of positive input NAND gate 320, pin 3, will be pulses equivalent to the number of pulses on the tape divided by eight. These pulses are fed along line 325 to the units counter 120, input pin 5 which is an up/down counter and along output pin 12 of the units counter 120 along line 327 to input pin 5 of the tens counter 122 when pulses increase above decimal nine. The units and tens counters 120, 122 will continue to count pulses until the data disappears from the tape. That will be the end of the address that was written on the tape. When the data disappears the retriggerable one shot timer 295 will time out which will remove the enable from both the divide by 16 counter 215 and positive input NAND gate 320.

When the divide by 16 counter 215 is disabled this will clear the eight bit minimum output signal appearing on pin 12 and when this signal goes low it will produce a differentiated pulse through capacitor C2 and resistors R3 and R4 which is fed along lines 218 and 219 through inverter 221, pin 11 to pin 10. This pulse is fed along line 340 through NOR gate 170 to load the address read in the readout device 75 along line 171. The readout indicators 75 obtain the number from the units counter 120 along lines 200 through 203 and from the tens counter 122 along lines 205 through 208.

Searching for a Number

In order to search for an address on either deck 1 or deck 2 the initial conditions are as follows. In accordance with the procedures to load a number into the registers and counters and readout registers, the number is loaded as described above. Since a normal search is being performed the circuitry is not in a record sequence of operation and thus the write enable signal on input line 210 is low. At this point the operator pushes the search switch 42. This loads the number into the registers 112, 114 into the counters 120, 122 and the readout 75 as described previously. This is accomplished from the signal through the search switch 42 being differentiated with R12, R13 and C7, that low going signal being fed along line 228 to the input pin 4 of negative input NOR gate 167, the high output of which on pin 6 is fed along line 174 to NOR gate 170 and along line 171 to the readout register. In addition, the high going signal from negative input NOR gate 167 is inverted with inverter 173 and the low output on pin 10 is fed along lines 174, 175 and 176 to the units counter 120 and the tens counter 122, respectively.

At the same time the differentiated signal is fed along line 230 to enable the search flop 116 on input pin 4 in the same manner as if the circuitry was in the record sequence of operation. However, the input signal to pin 2 of the start/delay timer 238 utilized in recording is low due to the low write enable signal on line 210 and thus, the record sequence is not initiated. Alternatively, the input to negative input NAND gate 235, pin 11, will be low to initiate the read sequence. The second input on pin 12 of negative input NAND gate 235 will naturally be low due to presetting the search flip flop 116, yielding a low output on pin 6 of that flop 116, which is fed to input pin 12 along lines 340 and 341.

As the output of the negative input NAND gate 235 goes high, that signal is fed along lines 344, 345 to remove the clear from a mode register 348, input pin 16. It also is fed along line 350 to input pin 13 of a second pass flip-flop 352 which removes the clear, and is used as an unknown address counter. The outputs of second pass flip-flop 352 are also utilized to condition the mode register 348 at input pins 2 and 3 thereof. The low signal on pin 9 of flop 352 is connected to input pin 3 of mode register 348 along lines 448 and 450 and the high signal on pin 8 of flop 352 is connected to input pin 2 of the mode register 348 along lines 449 and 451.

Finally, the high signal is fed along line 354 to inverter 356, the low output of which is differentiated with C15, R22 and R20 and the differentiated pulse is fed to input pin 9 of negative input NOR gate 358, the output of which, on pin 8, is fed along line 360 to load the mode register 348 at input pin 8. This mode register 348 was set and conditioned as explained above so that when the load pulse appears on pin 8, the mode register 348 is initiated on position A, the first designated position.

The output of position A starts the tape moving at a fast forward speed by creating output signals on output lines 371, 366 designated "search B" and "search enable." This is accomplished in the following manner.

The output from pin 15, QA, is inverted with inverter 368 and fed along line 370 to the output line 371 which is designated search B. In addition, search enable has been enabled from the inverted output on pin 2 of inverter 356 being fed along lines 374, 375 and 376 to input pin 6 of negative input NAND gate 378, the output of which is fed along line 380 to NOR gate 251 to create the enable on output pin 1. The second input of negative input NAND gate 378 on pin 5 is enabled by the low signal which appears on the output of negative input NOR gate 380 along lines 382 and 383. As will be explained below, a high output will appear on the output pin 8 of the negative input NOR gate 380 to disable that NAND gate 378 when certain conditions occur such as reaching the end of a tape prior to reversing direction.

The tape moves forward at a fast high speed and addresses are read as they appear on the tape as explained above. Also as explained above, a desired address, or the address which is being searched for, has been entered into the units and tens register 112, 114 and the addresses which are being read are being entered into the units and tens counters 120, 122 as explained above. The output of each of the registers 112, 114 and counters 120, 122 are connected to comparators 385, 387 referred to as the units comparator 385 and the tens comparator 387. The counter 120, 122 outputs are connected to the comparators from output pins 3, 2, 6 and 7 of the counters 120, 122 to input pins 10, 12, 13 and 15 of the comparators 385, 387. Similarly, the 1, 14, 11 and 8 output pins of the registers are connected to the 9, 11, 14 and 1 input pins of the comparators 385, 387, respectively.

The comparators 385, 387 have three outputs appearing on pins 5, 6 and 7. A high signal will appear on output pin 5 if the desired address is greater than the address being read, a high signal will appear on output pin 6 if the desired address is equal to the address being read and a high output will appear on pin 7 if the desired address is less than the address being read. These outputs are connected to positive input NOR gates 392 and 393, having output pins 1 and 4.

Since the output signal signifying that the desired address is equal to the address being read is connected to both NOR gates 392, 393 at pins 3 and 6 thereof, the logical significance of the outputs of the NOR gates 392, 393, at pins 1 and 4, respectively, will be that the signal on pin 1 will go low when A is less than or equal to B and the signal on pin 4 will go low when A is greater than or equal to B.

The output of these NOR gates are connected to a select gate 290 comprising two negative input NOR gates 395, 396 and an AND gate 398 which is controlled by whether or not the tape is moving in the forward or reverse direction.

If the tape is moving in the forward direction, the select gate 290 is enabled to look for an address on the tape which is greater than or equal to the desired address. If the tape is moving in the reverse direction the select gate 290 is enabled to look for an address which is less than or equal to the desired address. This is accomplished with input pins 2 and 5 of the select gate 290.

Input pin 5 is connected through an inverter 401 and negative input NOR gate 403 to the signal designated search A and search B, which, as will be explained below, cause the tape to run forward at a normal recording speed or to run forward at a fast speed, respectively. Input pin 2 of the select gate 290 is connected directly through lines 404 and 405 to the signal designated "search C" which, as will also be explained below, causes the tape to move in a fast reverse mode of operation. The output indicating that the address being read is greater than or equal to the desired address or less than or equal to the desired address is fed from output pin 6 along line 408 to a positive input NAND gate 410, pin 12. The second input to the positive input NAND gate 410, pin 13, is obtained along lines 412, 414 from the output of an inverter 221 which, as explained previously, indicates that an address with at least eight bits is being read. Consequently, the NAND gate 410 will be enabled when the address being read is greater than or equal to the desired address when the tape is moving in a fast forward direction.

When that occurs, an output pulse will appear at output pin 11. This is fed along line 416 to input pin 10 of the negative input NOR gate 380, the output of which, on pin 8, is fed along line 383 to clock the mode register 348. This moves the mode register 348 to its second position, designated position B, appearing on output pin 3 which is a rest position. Two rest positions are utilized at various times throughout the search sequence so that the tape is not jerked from one mode of operation to another mode of operation. This is accomplished with read timing gap timer 414 which is initially clocked because the mode register 348 has moved away from position A. Consequently, a low signal will appear on output pin 15 which is fed along line 418 to input pin 1 of the read timing gap timer which is shown as an inverter 420 which provides the second enabling signal to initiate that timer 414. This timer 414 takes approximately 140 milliseconds to time out and consequently the tape motion must come to a halt within that allocated time.

When the read timing gap timer 414 expires the output is differentiated from pin 13 with C9, R9 and R10 and the differentiated pulse is fed along line 422 to pin 13 of negative input NOR gate 380. This clock pulse appears on output pin 8 and if fed along line 382 to clock the mode register 348 from position B to position C. The output of position C, output pin 13, is inverted with inverter 426 and fed along lines 428 and 429 to output pin 12 designated search C. As explained above, search C will cause the tape motion to be controlled in the fast reverse mode of operation.

As above, addresses will be read in the reverse direction but because the tape is moving in the fast reverse mode of operation rather than the fast forward, it causes the select gate 290 mentioned previously to look for an address less than or equal to the desired address. When an address appears that is less than or equal to the desired address, output pin 6 of the select gate 290 again goes high which is fed to input pin 12 of the NAND gate 410 to produce a pulse which shifts the mode register 348 into position D to start the rest timer 414 again.

The read timing gap timer 414 is initiated in this instance off the output of the inverter 426 which is fed along lines 428, 435, 436 to the second enabling input of the AND gate 440 on the read timing gap timer 414. Consequently, when the mode register moves from position C to position D, the low output on pin 13 is inverted to a high output on pin 12. This high output is fed along those lines to the NAND gate 440 to enable it. After a wait of 140 milliseconds, in the same manner, the mode register 348 is shifted into position E, the output of which, on output pin 10, is connected with lines 432 and 433 to input pin 8 of NOR gate 250, the output of which initiates the search A mode of operation. As explained below, this will cause the tape to run forward in a normal or slow speed.

As the tape moves forward at a slow speed the addresses are read in the same manner as described above and if the address is located the output of pin 6 of the comparator 387 will indicate that the address being read is equal to the desired address. As will be explained below this will clear the system and the tape will be stopped in the proper position.

Assume, however, that the number on the tape is misread or does not exist. The system is designed to check twice for each and every number. Consequently, if an address greater than the desired address is read it will be indicated on output pin 5 of the comparator register 387 and will be fed along through positive input NOR gate 393 to select gate 290. The output signal appearing on pin 6 of the select gate 290 is fed along line 408 through positive input NAND gate 410, line 416, to negative input NOR gate 380 and along lines 382, 383 to again clock the mode register 348 out of the run forward mode of operation.

When the mode register 348 shifts the absence of the high signal from output pin 10 of the mode register 348 is detected along lines 432, 433 by the positive input NOR gate 250 creating a high output on pin 10 of the NOR gate 250 which is fed along lines 444, 445 to clock the second pass, unknown address flip-flop 352, input pin 11. When the second pass flip-flop 352 is clocked, the output signals from pin 9 and pin 8 are fed along lines 448, 450 and 449, 451, respectively, to input pins 2 and 3 of the mode register 348. Consequently, instead of initiating the system during the second pass in the fast forward position which is governed by input pin 2 of the mode register, the system is initiated in the rest position which is input pin B. In addition, the low signal from output pin 8 of the flip-flop is fed along line 449 and 452 through a differentiator comprising C14, R21 and R23 to the input of negative input NOR gate 358. The output pulse which is emitted therefrom is fed along line 360 to load the mode register in mode B.

The high output from output pin 9 of the second pass flip-flop 352 is also fed along lines 448, 454 and 456 to the input of positive input NOR gate 460, the output of which is fed along line 462 to input pin 9 of negative input NAND gate 464 which partially enables that NAND gate indicating that the system is making a second pass.

Finally, the pulse generated by the differentiator comprising C14, R21 and R23 is also fed along line 466 to clock the read timing gap timer 414 with input pin 3 thereof. When the read timing gap timer times out the signal from output pin 13 is differentiated with differentiator C9, R9 and R10, is fed to negative input NOR gate 380, the output of which taken from output pin 8 and is fed along lines 382, 383 to clock the mode register 348 to the fast reverse mode of operation, position C.

The tape runs in the fast reverse mode of operation until a signal is generated from output pin 6 of the select gate 290 indicating that a number has been read which is less than or equal to the desired address. Since an address was not detected in the fast forward or run forward modes of operation initially that was equal to the desired address, it is unlikely that an address will now be read which would be equal to the desired number. Consequently, the first indication emanating from that gate 290 will be that an address has been read which is less than the desired address. When that occurs, the mode register 348 will again be clocked to the rest position, position D, and after the timer 414 times out, the mode register 348 will again be clocked to position E which is run forward.

As explained above, there is a second pass signal on pin 12 of positive input NOR gate 460, the output of which on pin 13 is fed along line 462 to input pin 9 of negative input NAND gate 464. Consequently, at the termination of the next sequential address which is read with counter 215, output pin 12, the output will go low, the trailing edge of the end of the data will be differentiated with differentiator C2, R3 and R4 and will produce a low going pulse at input pin 8 of negative input NAND gate 464. This will produce a high going pulse on output pin 10 of the negative input NAND gate which is fed along line 470 to input pin 9 of positive input NAND gate 473. Since the system is operating in the run forward direction and speed, the output from pin 10 of the mode register 348 will be high and this signal is fed along line 432 to the second input, input pin 10 of the positive input NAND gate 473. A low pulse will therefore appear at the output of pin 8 of the positive input NAND gate 473. That pulse is fed along line 476 to negative input NOR gate 180, input pin 5, the output of which on pin 6 is utilized as explained above to clear the search sequence.

If at any time the desired address is located this will produce an output pulse emanating from output pin 6 of the comparator 387 and is fed along lines 478 and 479 to input pin 11 of positive input NOR gate 460 which will, in the same manner as explained immediately above, produce an output pulse on pin 8 to stop and clear the system.

Tape Motion Controls, Search Sequence

Figure 2:
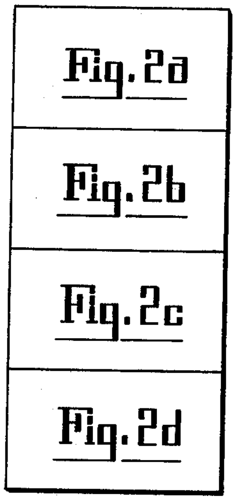
FIG. 2 including

As explained above, when a tape motion mode of operation is initiated with the logic circuitry shown in FIG. 3, it generates an input signal to the tape motion control circuitry shown in FIG. 2 designated "search A," "search B," "search C," plus a "search enable" signal. In addition, tape motion is controlled by the various push button switches described in relation to FIG. 1, such as the read switch 30, the read two switch 31, the record switch 35, the dup switch 33, the stop switch 41, and the like.

The search enable signal generated by the circuitry shown in FIG. 3 is primarily utilized as one of the enabling signals to clear a buffer (not shown) designated a read buffer which stores information which is to be duplicated from one tape deck to the other tape deck or to be typed from one tape deck onto hard copy. The read buffer is cleared any time a sequence or mode of operation is changed so that information remaining in the buffer will not appear at the beginning of the next operation. For example, if one-half of a letter is typed with the automated typing system and the tape is then rewound to begin typing a new letter, information currently stored in the buffer would be cleared so it does not appear on the beginning of the next letter.

Referring now to FIG. 2, the search enable signal clears the read buffer with a read buffer clear signal emanating from output pin 1 of a positive input NOR gate 503. This is initiated from the search enable signal which appears as a low going signal on the input line 505 and is fed along line 506 to input pin 12, of a negative input NAND gate 507. The second enabling input on input pin 11 originates from either of two alternate action flip-flops 510, 512 indicating that the system is either recording or in a tape write sequence of operation.

As shown in FIG. 2, the condition of the record flip-flop 510 is fed from pin 2 along lines 513, 514, 515 and 516 to pin 11 of the negative input NAND gate 507 and the condition of the tape write flip-flop 512 is fed from pin 12 along lines 518, 519, 520, 515 and 516 to the same input pin 11 of the negative input NAND gate 507. The negative input NAND gate 507 is then conditioned to be cleared any time a search enable signal is received. The output of the NAND gate 507 is fed to the input pin 3 of the NOR gate 503 to clear the read buffer.

In addition, certain other operating conditions will initiate a read buffer clear signal through the NOR gate 503. These are all connected to the read buffer clear signal (RBC) with a negative input NOR gate 522, the output of which is fed from output pin 8 along line 523 to the input of the NOR gate 503 to initiate the read buffer clear signal. As an example, when the master clear signal occurs, that signal appears as a low going signal on input line 525, is inverted with inverter 526 and fed along lines 527, 528 to a second inverter 530 which reinverts it to a low going signal, that low going signal is fed along lines 531 and 532 to input pin 12 of the aforementioned negative input NOR gate 522.

A second example would be when an operator stops reading the deck two tape and wishes to rewind it to start at the beginning of the tape or to begin a new tape. In this instance, a "read two" signal will be present and when the operator depresses the rewind two switch 29, a rewind two signal will be present. The read two switch 31 creates a signal on input line 534 while the rewind two switch 29 will initiate a signal on input line 536. The rewind two signal is fed along lines 536 and 537 to input pin 13 of NAND gate 540, the output of which is fed along line 541 to the input pin 13 of the negative input NOR gate 522. Depression of the read two switch creates a high going signal on line 534 which is differentiated as shown in FIG. 2 and inverted with inverter 548, the output of which clocks the read two flip-flop 550 to change its state.

In a similar manner, if the system is reading the first tape deck 24 and the rewind button 28 is depressed for that tape deck, a read buffer clear signal will be generated. This is accomplished as follows. If the read two flip-flop 550 is set to indicate that the system is in the read two sequence of operation, the alternate output taken from output pin 9 indicates that the system is not in read one. similarly, if the read two switch 31 has not been depressed, the read two flip-flop 550 will indicate that it is not in the read two sequence of operation. Consequently, the output from pin 9 indicates that the system is operating in the read one condition or in other words, is reading deck one 24. This signal is fed along lines 555, 556, 557 and 558 to the input pin 10 of NAND gate 560. The second input to the NAND gate 560 is obtained from the rewind one line 563 along line 565. Consequently, if the system is operating from tape deck one and the operator pushes the rewind one button 28, a low going signal will appear on the output pin 8 of that NAND gate 560 and is fed into the input pin 9 of the negative input NOR gate 522, the output of which, as described above, will clear the read buffer.

Finally, simple depression of the read two switch 31 at any time clears the read buffer as it is fed along line 567 to the last input, pin 10, of the negative input NOR gate 522.

As indicated in the prior discussions, the signal designated "search A" is utilized to drive the tape drive in a run forward speed which is a normal speed. The search A signal is conditioned with the use of tape deck designation signals. This is accomplished as follows. The search A signal, which is a low going signal on line 570, is inverted with inverter 572 and is fed to the input pins 12 and 13, of two NAND gates 574, 575, along lines 576, 577 and 578, respectively. One of these NAND gates 574 or 575 will be enabled and the other will not. Pin 13 of NAND gate 574 is enabled in a not read two or read one operating condition. Pin 12 of NAND gate 575 is enabled in the read two operating condition. This is accomplished in the following manner.

As explained above, output pin 9 of the read two flip-flop 550 will yield a low output indicating that the system is not in read two or is in read one. The high output, accordingly, would be read on the output pin 8 of that flip-flop 550. The low output is fed along lines 555, 556 and 580 to the input of a negative input NAND gate 582, input pin 11. The second enabling signal on input pin 12 of that negative input NAND gate 582 is obtained from the tape write flip-flop 512 and the record flip-flop 510 indicating that the operator is neither writing on tape nor recording at the time. These signals are fed from pin 2 of the record flip-flop along lines 513, 514, 515 and 584 to input pin 12 and from the tape write flip-flop 512 from output pin 12, lines 518, 519, 515 and 584 to input pin 12 of the negative input NAND gate 582. This will fully enable the NAND gate causing tape deck two to run forward at a normal speed as will be explained below.

However, if output pin 9 of the read two flip-flop 550 is high, this indicates that the operator desires to read tape 1. This signal is fed along lines 555, 556 and 580 to the negative input NAND gate 582. Since the input is high to input pin 11, a low output will appear on output pin 13, is inverted with inverter 586 and fed along lines 587, 588 and 589 to the input pin 13 of the NAND gate 574. The low output from the NAND gate 574 from pin 11 is fed along line 590 to one of the inputs, pin 4, of negative input NOR gate 592, the output of which is fed along line 594 to the run forward control. In addition, to interlock the tape from one direction to another, that signal is also fed with line 596 to input pin 2 of a NOR gate 597 which prevents or inhibits the rewind control from being activated.

Conversely, if the initial condition exists wherein the read two flip-flop 550 is clocked to indicate that the operator wishes to read tape deck two, a low output appearing on output pin 9 indicating that the system is not in the read one operation will be fed along line 555, 556, 580 to input pin 11 as described above. Since both inputs will now be low to that NAND gate 582, output pin 13 will go high and this is fed along lines 601 and 602 to NAND gate 575, described above, the low output of which on pin 11 is fed through a negative input NOR gate 604 to run the second tape deck forward at a normal slow speed and to again inhibit a rewind of that tape deck with the use of input pin 6 of NOR gate 606.

In the same manner as above, a signal appearing at input line 610, designated search B, causes either tape deck one 24 or tape deck two 25 to run forward at a very fast speed, designated fast forward. Again, the search B input signal is fed to input pins 11 and 9, respectively, of negative input NAND gates 612, 614 and the signal from the read two flip-flop 550 indicating whether the operator is operating deck one or deck two is fed to the input pins 12 and 8 of those NAND gates 612, 614, respectively. The outputs of each NAND gate are fed along lines 616 and 617, and 619 and 620, respectively, to cause the tape motion to run forward in fast forward speed on tape one or tape two. In addition, the signals are fed to the second inputs of the positive input NOR gates 597 and 606 to inhibit a rewind of those tapes while they are traveling in a fast forward direction.

Finally, the search C signal on input line 622 is utilized in the same manner as above to cause the tape to run in a fast reverse mode of operation. As with the other two modes, the low going input is inverted with inverter 624 and is fed to the input of two NAND gates 626 and 628, the other inputs of which are enabled in one case and disabled in the other case by the read two or not read two signal generated by the read flip-flop 550. The outputs of each are fed to negative input NOR gates 631, 632 to cause the tape deck to move in a fast reverse direction. The second inputs to the negative input NOR gates 631, 632 are tied to the rewind one and rewind two enable circuitry along lines 563, 536, through inverters 634 for rewind one and 635 for rewind two so that if the operator depresses a rewind switch 28 or 29 to create the enables, the tape decks will automatically go to a rewind mode of operation unless the inhibit rewind signals are present as described above.

Tape Motion Controls, Standard Sequences

In addition to the tape motion which is controlled electronically during the search procedure, the operator of the system can also control motion of the tape with the push buttons indicated in FIG. 1. For example, the system only records on deck one, 24. In normal operation if that deck is going to be duplicated, after information is recorded on deck one, 24, the tape is removed from deck one, 24, and inserted in deck two, 25, and a new tape is inserted into deck one. Recording then takes place in the deck one station. Consequently, if the record switch 35 has been depressed it automatically moves deck one. This is accomplished primarily with the read two flip-flop 550 and the overriding record flip-flop 510. The output of the read two flip-flop 550, pin 9, is fed along lines 555, 556 and 580 to input pin 11 of a NOR gate 582. The output, pin 6, of the record flip-flop 510 is fed along lines 514, 515 and 584 to input pin 12 of the NOR gate 582. Both of these inputs must be low before a high output will appear on pin 13 of the NOR gate 582 which is necessary in order to go into the run forward two mode of operation. As described above, the output of the NOR gate 582 is fed along lines 601, 602, NAND gate 575, negative input NOR gate 604 to output line 605 to cause tape deck two to move at a run forward speed. All other conditions of the input of NOR gate 582 create a partial enable for the deck one circuitry as described above to move it at the run forward speed.

In addition, other logical gating energizes lights (not shown) on the switchboard indicating in which mode of operation the system is operating. For example, the output of pin 9 from the read two flip-flop 550 is fed along lines 555, 640 and 642 to inverter 644, the output of which, pin 8, energizes a read two light in push button 31 shown in FIG. 1.

Other operator selected modes of operation are the rewind controls on input lines 503, 536. These enable signals are fed directly through the logical gating shown in FIG. 2 to the tape motion controls. For example, rewind one is fed along line 563 through inverter 634 along lines 648, 649 and 650 to input pin 5 of negative input NOR gate 631 to the fast reverse one output line 633. The rewind two input signal is fed along lines 536, 652, 653 through inverter 635, line 654 to input pin 5 of negative input NOR gate 632 to the fast reverse two control on line 634. As explained earlier, under certain conditions a rewind or fast reverse will not occur due to the inhibit rewind signals connected to a power supply board not shown. Therefore, if an operator is running in a fast forward or slow forward speed, depression of either rewind switch 28 or 29 will be ignored unless a stop condition is initiated.

A read switch 30 is provided, the input signal from which is fed along lines 660 and 662 to two negative input NAND gates 664, 665 and a NOR gate 667. The second enable of which is originated from the read two flip-flop 550 discussed earlier. The output of the read two flip-flop 550 on pin 9 is fed along lines 555, 640 and 670 to negative input pin 6 of the first negative input NAND gate 664. If read two is enabled, the output pin 4 of NAND gate 664 will go high and is fed through NOR gate 667 to initiate the read sequence in the search circuitry discussed earlier. The other negative input NAND gate 665 is fully enabled when the outputs of the record flip-flop pin 2 and tape write flip-flop pin 12 indicate that the system is not in the record sequence of operation.

A write enable or record signal is entered from the input keyboard, switch 35 shown in FIG. 1, into the tape motion control board on input line 670. A debouce capacitor C16 is provided along with a differentiator comprising C15 and R10, R12. That signal is fed along lines 671, 672 through inverter 674 to the input of the record flip-flop 510, input pin 3. As with the read two flip-flop 550 the record flip-flop 510 is also an alternate action flip-flop. Output pin 5 is utilized with inverter 676 to energize the record light on the keyboard, switch 35.

A file protect input to the tape motion control board is on line 678. This comprises a small tab on the bottom of the tape cassette utilized in deck one. If the tab has been broken out this is detected with a sensor (not shown) to produce a signal on the file protect input so that any record signal will be ignored. This is accomplished with the use of inverter 681, the output of pin 12 of which is fed along line 682 to negative input NOR gate 690, pin 9. The output of NOR gate 690 is inverted with inverter 692 and utilized to inhibit the record flip-flop 510 at input pin 4 thereof.

To duplicate information from deck two onto the tape in deck one, the only recording deck, a dup switch 33 is provided shown in FIG. 1, the input of which on line 696 sets a dup flip-flop 698. This automatically puts the system in the record sequence of operation. This is accomplished from output pin 5 of the dup flop 698 which is connected along lines 701 and 702 to input pin 1 of the record flip-flop 510, which sets that flip-flop 510 to automatically put the system in record. In addition, output pin 5 is also connected along lines 701, 702 and 703 to input pin 13 of the read two flip-flop 550 which automatically sets that flop to read deck two. Consequently, duplication occurs only in one direction; from deck two to deck one wherein deck one is the recording deck.

As shown in FIG. 1, a stop switch 41 is provided which provides an emergency stop for the operator.

That signal is initiated on input line 705 of the system and is fed connected to input pin 3 of the negative input NOR gate 707 and along line 708 through NOR gate 710, line 711 to the tape write flip-flop 512, pin 13. It is also fed along lines 705, 713, 714, negative input NOR gate 716, line 718, NOR gate 720, line 722 to the input of the read tape flip-flop 725.

As described below the stop switch 41 signal is also used to inhibit a forward positioner flip-flop 728, and to clear the visual indicator counter 75. The forward positioner flip-flop 728 is utilized in a backup/forward sequence to be discussed below.

To inhibit the forward positioner flip-flop 728 the signal is fed along lines 705, 713, 733 to negative input NOR gate 735, input pin 10, NOR gate 737, along line 740 to the forward positioner flip-flop 728. This signal is also fed to negative input NOR gate 742, the output of which is differentiated with C24, R17 and R18, that pulse being fed along line 744 to negative input NOR gate 746, input pin 1, to clear the visual counter 75.

The signal designated BOT record on input line 750 is a high going signal on input line 750 of the system. This occurs on the clear leader portion of a tape. That high signal is connected along lines 752 and 753 to input pin 12 of a NAND gate 755. When the record enable has been energized as explained above, pin 13 will also be high. Thus, output pin 11 will go low. This is fed along lines 757 and 759 to input pin 13 of a negative input NOR gate 761 and along line 763 through inverter 764 and along line 766 to negative input NOR gate 592, line 594 to run the tape forward at a normal recording speed. When the tape has moved past the clear leader, the BOT signal line 750 goes low. Consequently, output pin 11 of the NAND gate 755 goes high which initiates the beginning of the tape record timer 770 at pin 10. The timer has a duration of approximately 40 milliseconds and during that period of time the output on pin 12 is also fed along line 772 to the input of negative input NOR gate 761 which, through the circuitry traced above, continues tape motion for the duration of the time or for about 40 milliseconds. This is to assure that the first line is not written on the clear leader of the tape.

When the circuitry initiates a command which indicates that a tape is going to be written, that will produce a signal at the start tape write input, input line 774. That signal is inverted with inverter 776, the output of which clocks the tape write flip-flop 512. In addition, input pin 12 of the tape write flip-flop 512 is high, that input being connected to the record flip-flop 510. Consequently, when the tape write flip-flop 512 is clocked output pin 8 will go low. This output is connected with line 778 to negative input NOR gate 761, pin 1, the third input to the negative input NOR gate 761 discussed above, to move the tape in the run forward direction. The tape will continue to move until either the stop switch 41 is depressed for an emergency stop or a stop write signal from the control circuitry appears on input line 780. This input is also fed along line 780 to input pins 4 and 5 of the negative input NOR gate 707 along line 708 to input pin 8 of the NOR gate 710 and along line 711 of the tape write flip-flop 512. The third terminating signal is the master clear signal on input line 525 which is inverted with inverter 526 and fed along lines 527 and 782 to input pin 9 of the NOR gate 710 and along line 711 to the tape write flip-flop 512.

In a similar manner, logical circuitry to control tape motion is initiated when a read enable signal is activated. That signal appears on system input line 784 and is fed to input pin 5 of a negative input NAND gate 786 which is fed along lines 787 and 788 to the read tape flip-flop 725, input pin 3. The negative input NAND gate 786 is a disabling gate. This is accomplished through input pin 6 which is connected along line 790 to the output of a NAND gate 792. The inputs to that NAND gate 792 are connected with lines 794 and 795 to the rewind input signals on input lines 563 and 536, respectively. The input to pin 9 of that NAND gate 792 is connected along lines 795 and 694 through inverter 634 to input line 563 and input pin 10 of NAND gate 792 is connected with lines 794, 636, inverter 635, lines 653, 652 and 636 to the rewind two signal. Consequently, if the system is not rewinding either the first tape deck or the second tape deck, both of those signals will be high, the output consequently will be low which will provide the second enable to the read tape flip-flop 725.

As explained above, three conditions will inhibit reading tape, each of which are connected to input pin 1 of the read tape flip-flop 725. Master clear which is fed through the inverter 526 along lines 782, 797, through NOR gate 720, along line 722 to input 1 and the stop switch, which is fed along lines 705, 713 and 714 to input pin 2 of negative input NOR gate line 716 to input pin 3 of NOR gate 720, the output of which is connected with line 722 to input pin 1.

Assuming that neither of those conditions exist when the read tape flip-flop 725 is clocked, output pin 5 will go high and is connected with line 799 to input pins 5 and 10 of NAND gates 803, 804, respectively. The second enabling inputs to those NAND gates 803 and 804 are connected to the read two flip-flop 550 indicating that the system has been conditioned to operate either in deck one or deck two. As explained above, if the system is reading deck two, pin 12 of the read two flip-flop 550 is high and this is connected with lines 805 and 552 to input pin 4 of NAND gate 803. Alternatively, if output pin 9 of the read two flip-flop 550 is high indicating that the system is not in read two, or is reading deck one, this high output is connected with lines 555, 556 and 557 to input pin 9 of NAND gate 804. The output of NAND gate 803, output pin 6, is connected with line 806 to negative input NOR gate 604 to run deck two in the forward direction. Similarly, the output of NAND gate 804, output pin 8, is connected with line 807 to input pin 5 of negative input NOR gate 592 which is connected to the run forward control for the deck one capstan.

Two occurrences can stop the system from reading tape. The normal occurrence is on the EOL signal on system input line 808 which indicates that a recognition code at the end of a block of data such as the end of a line has been reached and that is all that is desired from that portion of the tape. The second occurrence is rarely utilized. It originates in a read buffer counter (not shown) designated RB200. This counter counts the characters taken off the tape and if it counts up to 200 characters it stops the tape read in that the read buffer (not shown) only contains room for 200 characters. Each of these signals are fed along lines 808 and 810, respectively, to input pins 1 and 13 of a negative input NOR gate 716, which is fed along line 718 to NOR gate 720, the output of which on pin 1 is fed along line 722 to the inhibit input of the read tape flip-flop 725, pin 1. As explained above, that will stop tape motion by causing output pin 5 to go low, thus removing the enable from NAND gates 803 and 804. These are the normal controls for reading the tape in a forward direction.

Remote enable is an interlock command which is fed to the dup flip-flop 698 which resets at the end of information preselected by the operator, such as word, line or paragraph, the end of the dup sequence of operation. The operator makes the selection with switches 37 through 40 shown on FIG. 1, designated word 37, line 38, paragraph 39 or page 40. When the end of the selected block of information is reached, the signal on line 812, the remote enable input, will go high which will clock the dup flip-flop 698 to terminate the duping operation. As with the other flip-flops discussed additional signals to disable the dup flip-flop 698 are depression of rewind one or rewind two switches 28, 29, a master clear, or the file protect input on line 678 as discussed above. These stopping signals are connected from their originating point as follows.

The rewind two signal is connected with line 536, 652, 814 to input pin 2 of a NOR gate 816. The master clear signal is inverted with inverter 526 and reinverted with inverter 530 and fed along lines 531, 817 and 818 to input 10 of the negative input NOR gate 690. The rewind one signal is fed along line 563, inverted with inverter 634, and fed with lines 648 and 820 to input pin 11 of negative input NOR gate 690. The file protect switch is inverted with inverter 681 and connected with line 682 to input pin 9 of negative input NOR gate 690. The output, output pin 8, of that negative input NOR gate 690 is connected with lines 822 and 823 to the other input, input pin 3, of NOR gate 816. The output of NOR gate 816 is fed with line 818 to the inhibit input, input pin 4, of the dup flip-flop 698. The aforementioned is basically the tape motion control for all tape motion other than line backup.

Line Backup Sequence

The system also has a block of logical circuitry which permits an operator of the system to go back and correct a previously typed block of data in which the operator has made a mistake. In each instance that a block of data or "record" is to be typed, it is initiated with a start tape write signal. As explained previously, this creates a predetermined length of tape which is caused by the 90 millisecond delay from the tape write timer to allow the capstan to get up to speed. This gap on the tape, referred to as preamble, contains a written signal of 4.8 kilocycles prior to the record to synchronize the clock. At the end of any block of information, there is a gap on the tape. This is created by the stop tape write input. At the point that the stop tape write signal stops the tape, a negative flux is created in the recording head which is an erase current. Naturally the tape takes a certain amount of time to stop due to the time it takes the solenoid to deenergize to stop the tape capstans. This creates approximately a 4/10 inch blank negative flux tape with no data. This is referred to as the "basic interrecord gap." The total interrecord gap is from the point that the tape goes blank to where a recognition code appears after the preamble. However, the full extent of no data on the tape occurs only during the period between the initiation of the stop tape write signal and the time the tape actually stops moving.

By using data on the tape in conjunction with the basic interrecord gap the system is designed so that the operator can back up to where an error was created and then go forward. This occurs one record at a time. Two input keys are utilized for this procedure, the margin release switch and the backup/forward switch. These two signals are connected to the circuitry shown in FIG. 2 on system input lines 820, 822, respectively. Only the backup/forward switch is utilized to go back records and the backup/forward switch in conjunction with the margin release switch will allow the system to move forward one record at a time. To move the tape back one record at a time, the backup/forward switch is depressed. The backup/forward signal is a high going signal while the margin release signal is a low going signal.

The backup/forward signal is fed to input pin 10 of a NAND gate 825, the other input to which is the normally high margin release signal. Consequently, the low going output of the NAND gate 825 sets a backup flag 732 along lines 827 and 828 to input pin 1 thereof. It disables the write enable to the amplifier. This is accomplished with a DC set/reset flip-flop constructed of two negative input NOR gates 742 and 830. The low going output from NAND gate 825 is fed along lines 827 and 832 to input pin 13 of the first negative input NOR gate 830 which disables the amplifier write enable along lines 834, 835 to NOR gate 837, the low output of which is fed to input pin 13 of a NAND gate 840 leading to the amplifier write enable. The other input to that NAND gate 840 is the original write enable signal. By disabling the amplifier write enable this assures that when the tape is moving in the reverse direction it will not be erased.

When the backup flag 732 is DC set, the output on pin 6 will be high and the output on pin 5 will be low. The low output from pin 5 is fed along lines 839 and 841 to negative input NAND gate 843, input pin 12. Input pin 11 of NAND gate 843 is also low because a second record flip-flop 845 has been cleared. Consequently, the output on pin 13 will go high to run the tape in the reverse direction.

The second record flip-flop 845 is cleared upon initiation of the backup/forward signal on line 822. Prior to the DC set of the backup flag 732, output pin 6 would be low. This is fed along lines 848 and 849 to the input of NOR gate 851, input pin 6. Input pin 5 to that NOR gate 851 originates at output pin 9 of the forward positioner flip-flop 728 which is not enabled until the margin release switch is depressed which will be explained below. Consequently, the output of pin 9 thereof is fed along lines 853 and 854 to input pin 5 of NOR gate 851. Since both inputs are low, the output on pin 4 will be high enabling the NAND gate 858. Depression of the backup/forward switch therefore sends a second high going signal along lines 822 and 861 to input pin 5 of the NAND gate causing a low output on pin 6 which is fed along lines 863 and 864 to clear the second record flip-flop 845. The low output on that flip-flop 845 assures that the tape runs in the reverse direction. Data from the tape is fed into the system on system input line 866. This is the data from deck one in that the backup/forward feature is to be operated from the first deck 24 in the console 22. The low going data signal is inverted with inverter 868 and is utilized to enable a data continuity timer 870. It is a reset, retriggerable timer which is provided to prevent the system from operating on isolated noise pulses. When it first triggers, the output on pin 13 goes high which sets a block timer 873. The duration of the block timer 873 is substantially larger than the short duration data continuity timer 870.

If only a noise pulse is registered on the tape the high signal from inverter 868 will set the data continuity timer 870, output pin 13 will go high which will set the block timer 873 through input pin 10, output pin 5 will go high. When the timer 873 times out, output pin 11 will go low, partially enabling negative input NAND gate 875. However, since no more data appears on the tape, the output of inverter 868 will be low. Therefore, the data continuity timer 870 will have a low output on 13 and a high output on 4. Output pin 4 is connected along lines 877, 878 and 879 to input pin 12 of negative input NAND gate 875 disabling that gate. Therefore, a first block flip-flop 880 will not be set thereby indicating that a first block of data was not read.

On the other hand, if a continuous stream of data is being read on system input line 866 the output of inverter 868, output pin 6, will remain high and the data continuity timer 870 output, pin 4, will remain low. This indicates that a block of data is being read. The low output being fed to input pin 12 of the negative input NAND gate 875 will cause output pin 13 to go high which will enable the first block flip-flop 880 on input pin 2 thereof. The next data will set the first block flip-flop 880 from inverter 868 along lines 869, 871 to input pin 3 of the first block flip-flop 880. This indicates that a first block of data is being read.

When the first block flip-flop 880 is set, output pin 5 will go high and output pin 6 will go low. The low output on pin 6 is fed to input pin 11 of a negative input NAND gate 883. The second input to that negative input NAND gate 883, input pin 12, originates fromn output pin 12 of the block timer 873. After the block timer 873 times out indicating that data was read, it will not be initiated again until after the data has gone away, after the interrecord gap has been passed, and until another block of data appears on input line 866, again initiating the data continuity timer 870 and the block timer 873. At that time output pin 5 will go high and output pin 12 of the block timer 870 will go low fully enabling negative input NAND gate 883 on pin 13 to enable the interrecord gap flip-flop 885 on pin 12 thereof. The interrecord flip-flop 885 is clocked in the same manner as the first block flip-flop 880 discussed above with data input. When the interrecord flip-flop 885 has been set, that indicates that the interrecord gap has been passed. Output pin 9 of the interrecord gap flip-flop 885 will go high and is fed with line 887 to input pin 5 of a NAND gate 890.

When the block timer 873 times out again output pin 5 of the block timer 873 will go low partially enabling negative input NAND gate 875 and if data is continually being read from the data input 866 the data continuity timer 870 will be set yielding a low output on output pin 4, this being fed along lines 877, 878, 879 to input pin 12 of the negative input NAND gate 875 creating a high output on pin 13 thereof. This high output is fed along lines 892 and 893 to the second input, input pin 4, of the NAND gate 890. This will create a low output on pin 6 thereof which is utilized to enable the second record flip-flop 845 which is clocked in the same manner as the first block flip-flop 880 indicating the system is monitoring the second record in reverse.

At this point the tape has passed one record backward and is beginning to enter a second block of data. At this point the system is set to pause and stop the run reverse. When the second record flip-flop 845 is set output pin 8 goes high and output pin 9 goes low. The high output from output pin 8 of the second record flip-flop 845 is fed along lines 895 and 896 to disable negative input NAND gate 843. When that negative input NAND gate 843 is disabled, the tape no longer runs in a reverse direction. The low output from output pin 9 is inverted with an inverter 898 and creates the second high signal to initiate a direction change timer 901 of approximately 140 milliseconds. When that timer 901 times out the trailing edge of the high signal on pin 13 is differentiated with C25, R21 and R22 to create a low going pulse which is fed along line 903 to negative input NOR gate 905, the high output of which on pin 3 is connected with line 906 to inverter 908 to create a low signal on output pin 12 of the inverter 908 which is connected with line 909 to the forward positioner flip-flop 782. When that flip-flop 782 is set output pin 9 goes high and output pin 8 goes low. The low output from pin 8 being fed along line 911 to input pin 1 of the negative input NOR gate 592 connected to the run forward control to start the tape in a forward direction. The high output on pin 9 is connected with line 912 to the NOR gate 853 to continue to inhibit the write enable amplifier so that nothing is erased on the tape and, in addition, is fed with line 854 to NOR gate 851, the output of which is connected to NAND gate 858 which is utilized to inhibit the second record, interrecord gap, and the first block flip-flops 845, 885 and 880, respectively, until such time as the system is in use again.

As mentioned earlier, the tape can move forward with the backup/ forward circuitry in two instances, one of which, as explained above, is when the system has moved backward one record. The second situation, as explained earlier, is when both the backup/forward key and the margin release key are depressed signifying that the operator wants to move only in the forward direction. This is accomplished as follows.

When the margin release key and the backup/forward key are both depressed simultaneously, the low going signal on the margin release key is connected with lines 820 and 914 to input pin 9 of NAND gate 825. The high signal from the backup/forward is also connected to input pin 10 of that NAND gate 825. However, the low going signal disables that NAND gate 825 and thus the high output will not set the backup flag 732. The high output from the backup/forward is also connected with lines 916 and 917 to input pin 4 of NAND gate 922 while the low going signal from the margin release key is inverted with inverter 919 and connected with line 920 to input pin 5 of that NAND gate 922.

The low going output on pin 6 thereof is connected with line 924 of the negative input NOR gate 905 mentioned earlier. As indicated, the high going output on pin 3 thereof is connected to input pin 10 of the forward positioner flip-flop 728 to set the forward positioner flip-flop 728 in the manner discussed above. Consequently, whether or not the system has been utilized to back up one record the initial conditions for the forward motion are identical and the sequence proceeds in the same manner.

As indicated earlier pin 9 of the forward positioner flip-flop 728 is connected through NOR gate 837 and NAND gate 840 to assure that when moving forward, the amplifier write enable is deenergized and therefore no information on the tape will be erased. Also, as indicated earlier at the termination of the backup phase the reading head was reading a second block of data. Since data is present the data continuity timer 870 will be set and output pin 4 will be low and will remain low until the data has passed. That low output is connected with lines 877, 878, 926 to input pin 11 of the forward positioner flip-flop 728. Immediately upon the termination of the data that output will go high which will clock the forward positioner flip-flop 728 causing output pin 8 to go high, thus terminating the run forward signal and the tape capstan will coast to a stop in the same manner as if the operator were recording on the tape. Consequently, the tape will be positioned at approximately the same point as where the record begins so that the information or error can be corrected on the tape.

Pin 8 of the forward positioner flip-flop 728 going high also is connected along line 928 to clock the backup/forward flag 732 so that the system is in precisely the condition it was prior to initiating the backup/forward sequence of operation with the exception of the amplifier write enable on line 729. The set/reset flop comprised of the negative input NOR gates 742, 830 has not been cleared so that no noise will be recorded on the tape when it is moving either in the rearward or forward direction. The flip-flop 742, 830 will be cleared in the event the stop switch 41 is depressed, the record switch 35 is depressed or if another similar sequence is initiated. This is accomplished in the following manner.

Both the start tape write signal and the stop switch signal 705 are connected to negative input NOR gate 735. The start tape write signal being connected along lines 774 and 930 to input pin 11 and the stop switch being connected along lines 705, 713 and 733 to input pin 10 of the NOR gate 735. In addition, the record enable from pin 6 of the record flip-flop 510 is connected to the third negative input of the negative input NOR gate 735 along lines 514, 520, 933 to input pin 9. If either of these events occur, the high output is fed through NOR gate 735 along line 935 to clear the inhibit through input pin 9 of the negative input NOR gate 742 comprising half of write enable flip-flop.

In this manner the system is returned to normal start up conditions and may be reinitiated by depression of the margin release and backup/forward switches.

In general, while we have described a specific embodiment of our invention, it is to be understood that this is for purposes of illustration only and that many various modifications can be made within the scope of the invention. For example, designation of the tape decks as deck one and deck two is one of choice only. Also, either or both decks may be operated in any of the modes or sequences described with appropriate modification. It should also be obvious that each digit of an address number may be recorded on tape and decoded in accordance with the teachings of our specification and that all such modifications are within the intendment of our invention.

We claim as our invention:

1. In an automated typing system of the type having information storage means for storing information to be typed comprising magnetic tape and tape drive means;

recording means for recording information on the information storage means; and typing means for reproducing all or selected portions of the information stored on the information storage means;

the improvement comprising means for registering address numbers of one or more digits to be recorded on the information storage means which designate the specific location of information to be typed by the typing means from the information storage means; and means for converting each address number contained in the registering means to a plurality of pulses to be recorded by the recording means on the information storage means which are at least a multiple of the corresponding address number whereby when the pulses are recorded on the tape by the recording means the converted address numbers are readable in either direction of tape drive and extraneous noise pulses do not provide a false indication of recorded information.

2. The improvement of claim 1 wherein the plurality of pulses for each address number is greater than a multiple of the corresponding address number.

3. The improvement of claim 2 wherein the plurality of pulses is equal to eight times the address number plus four additional pulses.

4. The improvement of claim 1 wherein each address number contains one or more digits and wherein the converting means converts each digit to a plurality of pulses which is at least a multiple of the corresponding digit.

5. The improvement of claim 1 wherein the plurality of pulses is recorded on the information storage means with the recording means and further comprising reading means for reading the plurality of pulses from the tape and decoding means for converting the plurality of pulses into the address number originally contained in the registering means.

6. The improvement of claim 5 wherein an address to be located is entered into the registering means and further comprising comparative means for comparing the address number in the registering means and the address number in the decoding means to determine whether or not they are equivalent.

7. The improvement of claim 6 wherein the tape drive means control the direction and speed of tape drive and wherein the tape drive means can be controlled to stop the tape precisely at the address location equivalent to the address contained in the registering means.

8. The improvement of claim 6 further comprising mode control means electrically connected to the tape drive means, the reading means and the comparative means for controlling the tape drive means wherein if the comparative means indicates that the number read from the tape is not equivalent to the number entered into the registering means, the tape will be driven inn the reverse direction and addresses will be read and compared in the reverse direction.

9. The improvement of claim 8 wherein if the address is read in the reverse direction and it is equivalent to the number in the registering means, the mode control means operates to drive the tape in the forward direction at a slow speed to position the tape precisely at the address location equivalent to the address in the registering means.

10. The improvement of claim 8 wherein if the address to be located is not read in the reverse direction, the mode control means operates to stop the tape at the next preceding address location.

11. In an automated typing system of the type having information storing means for storing information to be typed comprising magnetic tape;

recording means for recording information to be typed on the information storage means wherein information is stored in blocks of information; and typing means for reproducing stored information on tape;

the improvement comprising means for moving the tape one of the blocks of information at a time without additional coding on the tape of any kind.

12. The improvement of claim 11 wherein the means for moving the tape moves the tape backwards one block of information at a time.

13. The improvement of claim 11 wherein the means for moving the tape moves the tape forward one block of information at a time.

14. The improvement of claim 11 wherein the means for moving the tape moves the tape in either direction one block of information at a time.

* * * * *